(12) United States Patent
Togino

(10) Patent No.: US 6,798,583 B1
(45) Date of Patent: Sep. 28, 2004

(54) PROJECTION OPTICAL APPARATUS

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/411,138

(22) Filed: Apr. 11, 2003

(51) Int. Cl.$^7$ .......................... G02B 3/02; G02B 17/00; G02B 9/00
(52) U.S. Cl. ................ 359/720; 359/651; 359/730
(58) Field of Search ............................... 359/649–651, 359/726–728, 720, 730, 630–632, 634, 637

(56) References Cited

U.S. PATENT DOCUMENTS

| | | | |
|---|---|---|---|
| 6,388,827 B2 | * | 5/2002 | Nagata et al. .............. 359/831 |
| 6,462,881 B2 | | 10/2002 | Takeyama .................. 359/630 |
| 6,464,361 B2 | * | 10/2002 | Togino et al. ............... 353/98 |

FOREIGN PATENT DOCUMENTS

| JP | 08-201755 | 8/1996 |
|---|---|---|
| JP | 08-251520 | 9/1996 |
| JP | 11-337863 | 12/1999 |
| JP | 2000-098272 | 4/2000 |
| JP | 2000-111800 | 4/2000 |

* cited by examiner

*Primary Examiner*—Georgia Epps
*Assistant Examiner*—William Choi
(74) *Attorney, Agent, or Firm*—Kenyon & Kenyon

(57) ABSTRACT

The invention provides a small-sized projection optical apparatus which uses a decentered prism as a projection optical system and in which some contrivances are provided to how to introduce illumination light into a reflection type display device. The projection optical apparatus comprises a reflection type display device 1, a projection optical system 2 for providing projection of an image displayed thereon and an illumination light source for illuminating a display surface. The projection optical system 2 comprises a catadioptric optical element 10 having two rotationally asymmetric curved reflecting surfaces 12, 13 having positive power. The illumination light source is located such that both a light ray leaving the display surface and arriving at a projection display screen and a light ray leaving the illumination light source and arriving at the display surface are reflected at the first and second reflecting surfaces as counted from the display surface side of the catadioptric optical element 10, and that the axis of illumination light 6 incident on the catadioptric optical element 10 is not included in a plane that passes through the axis of projection light 7 leaving the catadioptric optical element 10 and the center of the display surface.

14 Claims, 12 Drawing Sheets

US 6,798,583 B1

PROJECTION OPTICAL APPARATUS

BACKGROUND OF THE INVENTION

The present invention relates to a projection optical apparatus, and more particularly to a front projector for magnifying and projecting an image on a reflection type display device onto a wall surface or a screen.

Conventional projectors have used a rotationally symmetric lens system. To obtain bright displays in this case, a reflection type display device such as a DMD (digital micro-mirror device or a reflection type LCD is used (see, for instance, JP-A 2000-98272).

Arrangements for illuminating a reflection type display device such as a PDLC or DMD through the whole or a part of a rotationally symmetric lens system have been proposed in JP-A's 8-20175 and 8-251520.

For a head-mounted type image display system using a decentered prism, which is not a projection optical system, illumination by a reflection type LCD has been put forward in JP-A 11-337863, wherein illumination by the reflection type LCD is carried out through some reflecting surfaces and transmitting surfaces of the decentered prism.

In this regard, JP-A 2000-111800 discloses an image-formation optical system comprising two decentered prisms. In this image-formation optical system, a prism with an optical path crossing over itself therein is used as the prism located on the image plane side.

SUMMARY OF THE INVENTION

The present invention provides a projection optical apparatus, comprising:
a reflection type display device,
a projection optical system for projecting an image displayed on the reflection type display device onto a projection display screen, and
an illumination light source for illuminating a display surface of the reflection type display device, wherein:
the projection optical system comprises an optical element having positive power,
said optical element being located in opposition to the display surface of the reflection type display device, and said optical element comprising at least two reflecting surfaces, at least one of which is defined by a rotationally asymmetric curved reflecting surface configured into a curved shape that imparts power to a light beam, and
the illumination light source is located such that given two light rays are reflected at at least first and second reflecting surfaces of the reflecting surfaces of the optical element as counted in order of a projection light ray traced from a display surface side, provided that said given two light rays are a light ray leaving the display surface and arriving at the projection display screen and a light ray leaving the illumination light source and arriving at the display surface,
said illumination light source being located such that an axis of illumination light incident on the optical element is not included in a given plane, wherein:
said axis of illumination light is defined by a center light ray of an illumination light beam from the illumination light source, said center light ray arriving at a center of the display surface,
an axis of projection light is defined by a light ray leaving the center of the display surface and arriving at the projection display screen through a center of a pupil of the optical system, and
said given plane is a plane that passes through the axis of projection light leaving the optical element and the center of the display surface.

The present invention also provides projection optical apparatus, comprising:
a reflection type display device,
a projection optical system for projecting an image displayed on the reflection type display device onto a projection display screen, and
an illumination light source for illuminating a display surface of the reflection type display device, wherein:
the projection optical system comprises an optical element having positive power,
said optical element being located in opposition to the display surface of the reflection type display device, and said optical element comprising at least two reflecting surfaces, at least one of which is defined by a rotationally asymmetric curved reflecting surface configured into a curved shape that imparts power to a light beam,
the illumination light source is located such that given two light rays are reflected at at least a first reflecting surface of the reflecting surfaces of the optical element as counted in order of a projection light ray traced from a display surface side, provided that said given two light rays are a light ray leaving the display surface and arriving at the projection display screen and a light ray leaving the illumination light source and arriving at the display surface,
said illumination light source being located such that an axis of illumination light incident on the optical element is not included in a given plane, wherein:
said axis of illumination light is defined by a center light ray of an illumination light beam from the illumination light source, said center light ray arriving at a center of the display surface,
an axis of projection light is defined by a light ray leaving the center of the display surface and arriving at the projection display screen through a center of a pupil of the optical system, and
said given plane is a plane that passes through the axis of projection light leaving the optical element and the center of the display surface, and the reflection type display device comprises a two-dimensionally arrayed micro-mirrors, each having a variable gradient so that an angle of emergence of reflected light can be varied.

Still other objects and advantages of the invention will in part be obvious and will in part be apparent from the specification.

The invention accordingly comprises the features of construction, combinations of elements, and arrangement of the parts, which will be exemplified in the construction hereinafter set forth, and the scope of the invention will be indicated in the claims.

DETAILED DESCRIPTION

Figure 1:
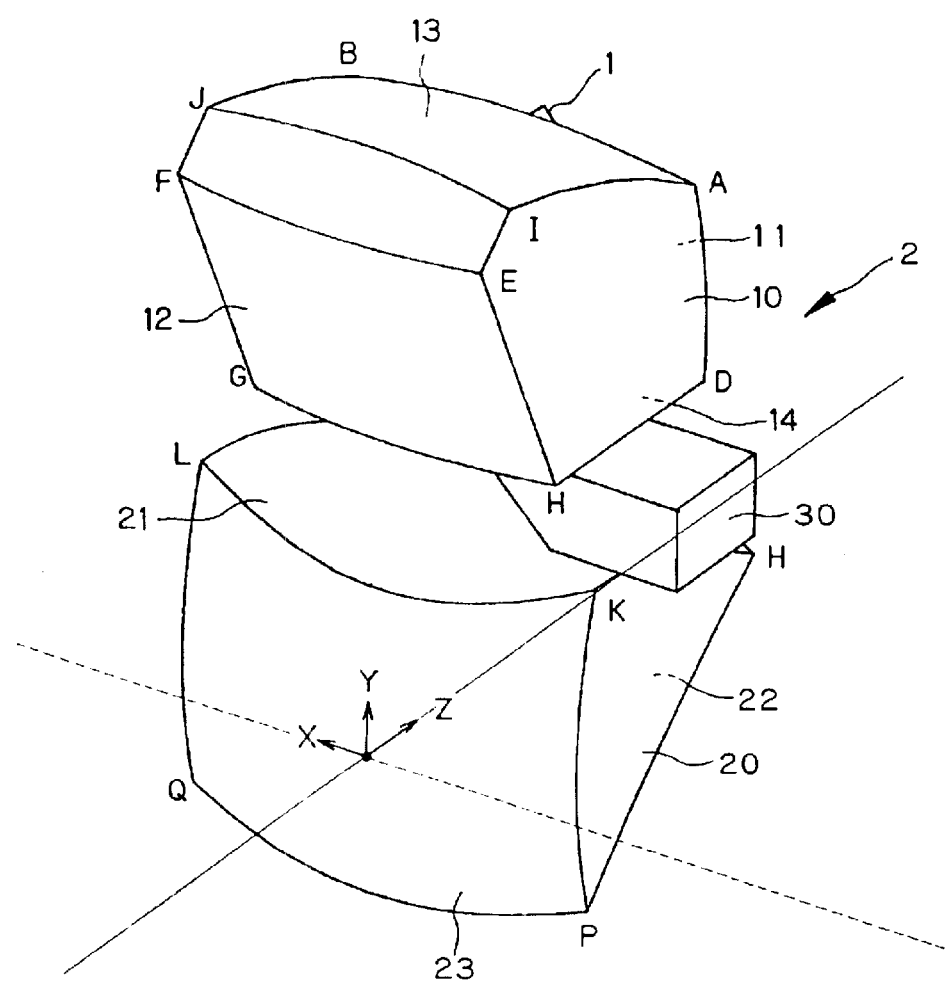
FIG. 1 is illustrative in perspective of the projection optical system in Example 1 according to the invention, as viewed obliquely from an upper portion of its projection display screen.

The reasons for using the aforesaid arrangements in the present invention, and the advantages thereof are now explained.

The projection optical apparatus of the invention is designed for projection of images displayed on a reflection type display device. The projection optical apparatus is provided with an illumination light source adapted to illuminate the projection optical system and the display surface of the reflection type display device.

The projection optical system comprises a catadioptric or reflecting optical element having positive power. These optical elements each comprise at least two reflecting surfaces. At least one of these reflecting surfaces is configured in such a curved shape as to impart power to a light beam. Having a function of correcting for decentration aberrations, that reflecting surface is also defined by a rotationally asymmetric reflecting surface. This optical element is located in opposition to the display surface of the reflection type display device.

Here, a decentered prism as set forth in JP-A's 11-337863, 2000-111800, etc. may be used as the catadioptric optical element. Having power, this decentered prism comprises at least two reflecting surfaces each configured in such a curved surface shape as to effect internal reflection. In the reflecting optical element, such reflecting surfaces are constructed of surface mirrors. The reflecting optical element is positioned with the reflecting surfaces located in the air with given position relations.

The rotationally asymmetric curved reflecting surface having a curved surface shape to give power to the light beam and having a decentration aberration correction function has a surface shape that is generally defined by a free-form surface. For instance, the surface shape of such a free-form surface may be defined by formula (a) in U.S. Pat. No. 6,124,989 (JP-A 2000-66105).

The kind and structure of the reflection type display device are not critical to the projection optical apparatus of the invention. In another projection optical apparatus of the invention, the reflection type display device may have such arrangement as mentioned below. That is, this reflection type optical device comprises a number of two-dimensionally arrayed micro-mirrors, each corresponding to a pixel. The micro-mirror has a variable gradient so that the angle of emergence of the reflected light is variable. Thus, this reflection type optical device can create on/off states.

Such a reflection type display device is known as a DMD (digital micro-mirror device). The DMD is described in "Optics", Vol. 25, No. 6, pp. 313–314, 1996). In the DMD, two-dimensionally arrayed pixels are each composed of a micro-mirror. For each pixel, the gradient of the micromirror is variable under the electrostatic field action of a memory device located just below it. For instance, the gradient of the micro-mirror is so controlled that the angle of reflection of the reflected light is variable thereby creating on/off states.

The optical system parts should here be positioned such that where the pixel is held off, the light reflected at the pixel forming micro-mirror does not enter the projection optical system, and where the pixel is held on, the light reflected at the pixel forming micro-mirror enters the projection optical system. Where the pixel is held on, the light reflected at the pixel forming micro-mirror enters the projection optical system, so that an image is formed on the screen. It is understood that the angle of inclination of each pixel forming micro-mirror upon held on is determined to be about 10° with respect to the surface of the DMD on which light rays are incident.

How to mount the illumination light source varies with the kind of the reflection type display device. Before explaining this, two light rays are defined. By definition, the first ray leaves the display surface of the reflection type display device, arriving at the projection display screen, and the second light ray emerges from the illumination light source, arriving at the display surface of the reflection type display device.

When no particular limitation is imposed on the kind and structure of the reflection type display device, the illumination light source is positioned such that both the first and the second light ray are reflected at at least the first and the second surface of the catadioptric or reflecting optical element as counted in order from its display surface side in the direction of propagation of projection light rays.

When the DMD is used as the reflection type display device, the illumination light source is positioned such that both the first and the second light ray are reflected at at least the first reflecting surface.

That is, the catadioptric optical element is located in opposition to the display surface of the reflection type display device. Then, illumination light and projection light are reflected at at least the first and the second reflecting surface of the catadioptric optical element. At this time, the illumination light illuminates the display surface and the projection light provides projection of an image on the display surface. Here, the optical system is partially shared by an illumination optical path and a projection optical path.

Alternatively, the illumination light and the projection light are reflected at the first reflecting surface of the catadioptric optical element. At this time, the illumination light illuminates the display surface and the projection light provides projection of an image on the display screen. Here, the optical system is partially shared by an illumination optical path and a projection optical path.

It is noted that the same action goes true even for the case where a reflecting optical element is used for the catadioptric optical element.

In either case, the illumination light source is positioned such that the axis of illumination light entering the catadioptric optical element is not included in a given plane. Here the "given plane" is understood to refer to a plane that passes through the axis of projection light leaving the catadioptric optical element and the center of the display surface.

The axis of illumination light is defined by the center line of an illumination light beam from the illumination light source and a light ray of the illumination light beam that arrives at the center of the display surface, and the axis of projection light is defined by a light ray that leaves the center of the display surface and arrives at the projection display screen via the center of the pupil of the optical system.

It is noted that even when the reflecting optical element is used for the catadioptric optical element, the same action as mentioned above is achievable.

In the present invention, the catadioptric or reflecting optical element is set up as a decentered optical system. In such a decentered optical system, the direction of decentration of each reflecting surface is defined by the direction of the aforesaid given plane, except a special decentered arrangement. Suppose now that in this plane there is the axis of illumination light entering the catadioptric or reflecting optical element. Then, the effective surface of each reflecting surface in the decentration direction must have a combined area for both the illumination optical path and the projection optical path, resulting in an increase in the size of the catadioptric or reflecting optical element or, alternatively, shading of a part of the light beam, making bright yet uniform projection difficult.

By contrast, if the decentered optical system is constructed such that the axis of illumination light entering the catadioptric or reflecting optical element is not included in the aforesaid given plane, it is then possible to enlarge the effective surface of each reflecting surface generally in a direction that crosses the direction of decentration. The effective range of each reflecting surface in the direction of decentration can thus be enlarged for either the illumination optical path or the projection optical path. This does not lead to an increase in the size of the catadioptric or reflecting optical element.

Especially when the catadioptric or reflecting optical element is a decentered prism having two reflecting surfaces, the decentered prism should preferably be set up as follows. That is, the decentered prism is constructed such that when the axis of projection light entering the first reflecting surface and the axis of projection light reflected at the second reflecting surface are projected onto a projection plane, the projected axes of projection light cross over each other. This enables the prism to be made compact. Here the aforesaid "projection plane" is understood to mean a plane that includes the axis of projection light reflected at the reflecting surface on which the axis of projection light leaving the display surface is first incident and the axis of projection light entering that reflecting surface.

The decentered prism, because of having two reflecting surfaces, is of the type that positive power is distributed to each reflecting surface, so that each reflecting surface can take on a gentler curved shape. This is also preferable because of no need of increasing the size of the prism.

Figure 3:
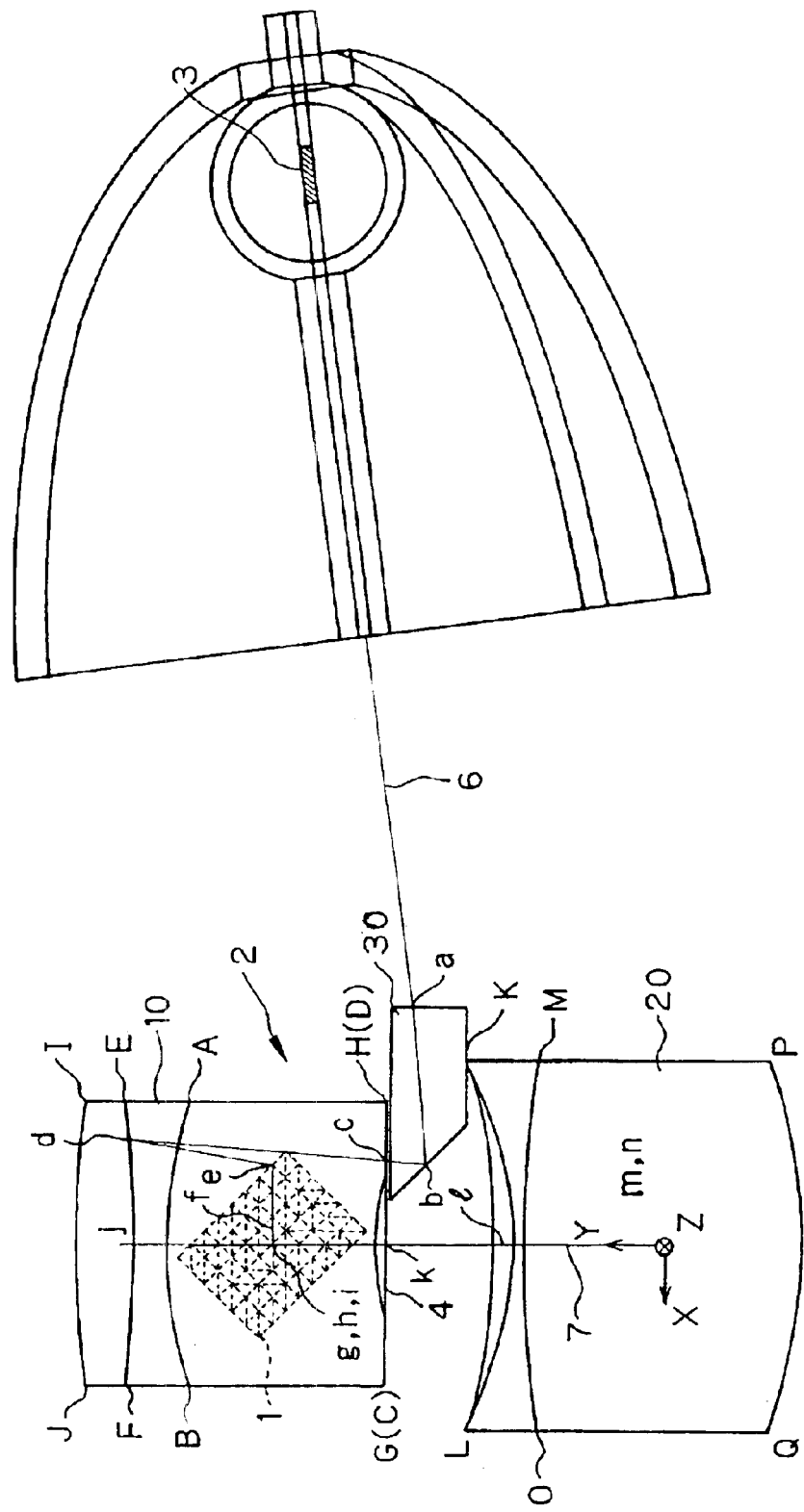
FIG. 3 is a front perspective view of Example 1 as viewed from the front side of FIG. 1, and FIG. 2.

This is now explained specifically with reference to the projection optical system in Example 1 given later. FIG. 1 is a perspective view of an optical system portion of Example 1 as viewed obliquely from above. Here, the optical system comprises a DMD 1 used as a reflection type display device, a projection optical system 2 for providing projection of an image displayed on the DMD 1, and an illumination light-introducing prism 30 for entering light from an illumination light source 3 into the projection optical system 2. The illumination light source 3 is shown in FIG. 3. Light from the illumination light source 3 enters a decentered prism 10 forming a part of the projection optical system 2 via the illumination light-introducing prism 30.

The projection optical system 2 comprises a decentered prism 10 and a decentered prism 20. In FIG. 1, a substantial portion of the DMD1 is hidden from view by the decentered prism 10. From FIG. 2 that is a perspective illustration showing details of the projection optical system 2 as viewed from the same direction, it is found that the DMD 1 is located on the back surface side of the decentered prism 10. FIG. 3 is a front perspective view of FIGS. 1 and 2 as viewed from front. A projection display plane or screen 5 (FIG. 5) is located in the −Z direction of the coordinates shown in FIGS. 1 to 3. An image appearing on the display surface of the DMD 1 is projected onto the projection display screen 5 via the projection optical system 2.

In this example, the decentered prism 10 has four optical surfaces. A surface ABCD defines an entrance surface 11 on which display light from the DMD 1 is incident. A surface EFGH defines a first reflecting surface 12 for reflecting the display light entered from the entrance surface 11 into the prism. A surface IJBA defines a second reflecting surface 13 for reflecting the display light reflected at the first reflecting surface 12. A surface HGCD defines an exit surface 14 through which the display light reflected at the second reflecting surface 13 leaves the prism.

The decentered prism 20 has three optical surfaces. A surface KLOM defines an entrance surface 21 for entering the display light emerging from the decentered prism 10 into the prism. A surface PQOM defines a reflecting surface 22 for reflecting the display light entered from the entrance surface 21 into the prism. A surface KLQP defines an exit surface 23 through which the display light reflected at the reflecting surface 22 leaves the prism.

Between the decentered prism 10 and the decentered prism 20 there is interposed a stop 4. The stop 4 forms the pupil of the projection optical system 2. It is noted, however, that the shape of the stop 4 is not depicted to the rightwith respect to illumination light.

The illumination light-introducing prism 30 is located in opposition to the exit surface 14 of the decentered prism 10. The illumination light-introducing prism 30 has a reflecting surface. The illumination light source 3 is located on the entrance side of the prism 30 (FIG. 3).

In this arrangement, an axial chief ray (axis) from the illumination light source 3 enters the illumination light-introducing prism 30 upon crossing the entrance surface of the prism 30 at a point a. Subsequently, the ray is reflected at the reflecting surface of the prism upon incidence on a point b, leaving the prism 30 via a point c. Subsequently, the ray enters the exit surface 14 of the decentered prism 10 at the same point c.

The axis of the illumination light entered into the decentered prism 10 is reflected at the second reflecting surface 13 upon incidence on a point d. Subsequently, the illumination light is reflected at the second reflecting surface 13 upon incidence on a point e, and enters the entrance surface 11 of the prism 10 at a point f, leaving the decentered prism 10.

Then, the axis of the illumination light is incident on the DMD 1 from its diagonal direction to illuminate the display surface of the DMD 1. At this time, the axis of the illumination light makes an angle of about 200 with the direction of the normal to the center g of the screen surface of the DMD 1.

The axis of projection light emerges from the center g of the surface screen of the DMD 1 in the direction of the normal. This axis of projection light is incident on a point h on the entrance surface 11 of the decentered prism 10, entering the decentered prism 10. Subsequently, the projection light is reflected at the first reflecting surface 12 upon incidence on a point i. Subsequently, the projection light is reflected at the second reflecting surface 13 upon incidence on a point j. Further, the projection light leaves the decentered prism 10 upon incidence on a point k on the exit surface 14 of the decentered prism 10, propagating toward the decentered prism 20 through the center of the stop 4.

The axis of projection light is incident on a point l on the entrance surface 21 of the decentered prism 20, entering the decentered prism 20. Subsequently, the projection light is reflected at the reflecting surface 22 upon incidence on a point m, leaving the decentered prism upon incidence on a point n on the exit surface 23 thereof. The axis of projection light leaving the decentered prism 20 arrives at the projection display screen (not shown). The image displayed on the DMD 1 is projected on a magnified scale.

Here, the illumination light source 3 is positioned such that the axis of illumination light incident on the point c on the decentered prism 10 is not included in a plane that passes through the axis of projection light emerging from the point k on the decentered prism 10 and the center g of the display surface (i.e., a plane that passes through the points g and k of FIG. 3 and is vertical to the paper of FIG. 3), so that the illumination light can be guided to the DMD 1 without causing an increase in the size of the decentered prism 10. It is thus possible to reduce the size of the projection optical apparatus.

Figure 2:
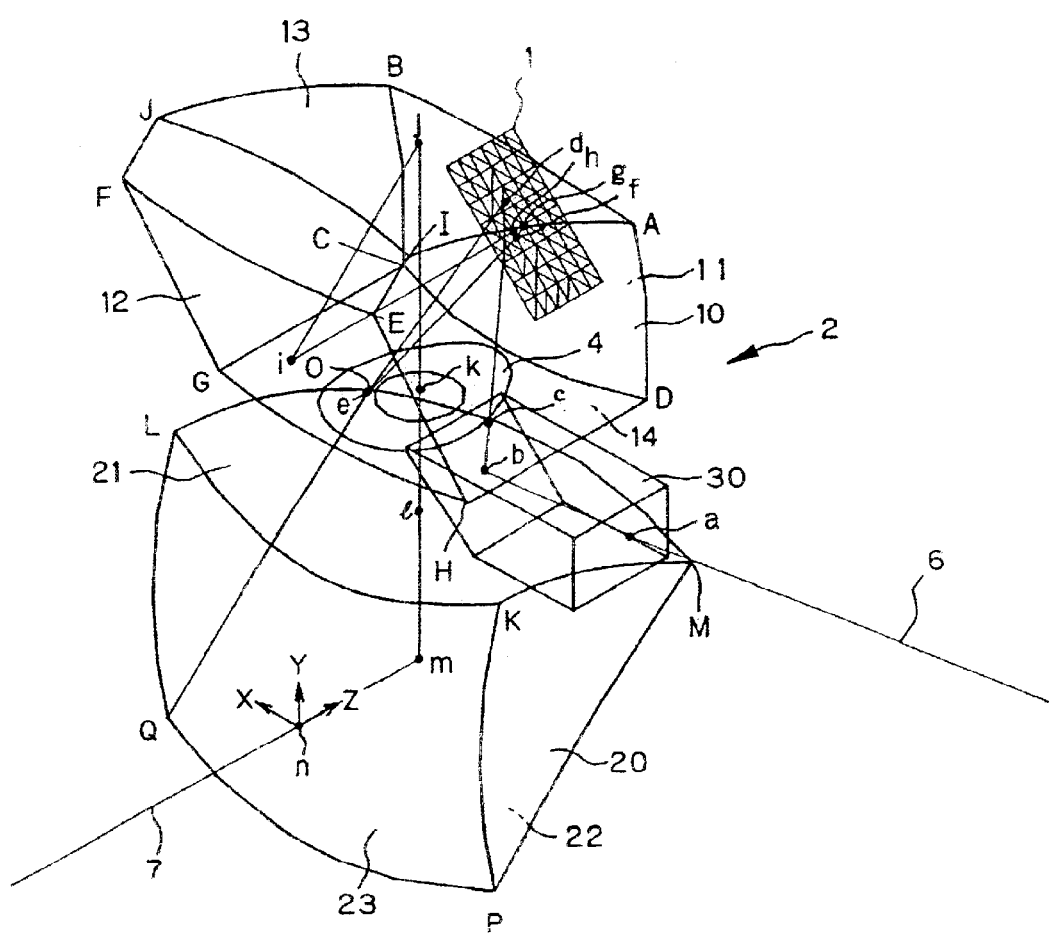
FIG. 2 is a perspective view showing details of Example 1 as viewed from the same direction as in FIG. 1.

In the arrangement of FIGS. 1 to 3, the projection optical system 2 comprises the decentered prism 20 in addition to the decentered prism 10. This is to project the image on a magnified scale while aberrations are well corrected. It is noted that the decentered prism 20 is located on the side of the decentered prism 10, from which the projection light rays (the axis of projection light) emerge. However, the present invention is not necessarily limited to this arrangement. For instance, it is acceptable to locate a rotationally symmetric refracting optical system in place of the decentered prism.

When an additional prism is located on the exit side of the decentered prism 10, it should preferably have one or more reflecting surface. Preferably in this case, the reflecting surface(s) should be configured in such a curved surface shape as to give power to a light beam and defined by a rotationally asymmetric curved reflecting surface having a function of correcting for decentration aberrations.

In both the first decentered prism 10 and the second decentered prism 20, the axis of projection light in the prism is included in a plane. It is noted that the plane in which the axis of projection light in the first decentered prism 10 is included may be parallel with the plane in which the axis of projection light in the second decentered prism 20 is included. Alternatively, those planes may be rotated 45° with respect to each other. In the latter case, the projected image, too, is rotated by such rotation. It is therefore required to rotate and locate the reflection type display device (the DMD 1 in the case of FIGS. 1 to 3) around the axis of projection light.

It is noted that the second decentered prism 20, too, may be constructed in such a way as to have two reflecting surfaces. As is the case with the first decentered prism 10, the decentered prism 20 may be constructed such that in the plane in which the axis of projection light in the second decentered prism 20 is included, the axis of projection light projected onto that plane crosses over itself. Alternatively, the second decentered prism 20 may be constructed in such a way as to have one reflecting surface.

It is understood that the present invention may also be applied to an arrangement where a reflection type liquid crystal display device is used as the reflection type display device.

When the DMD is used as the reflection type display device, it is preferable that the direction of deflection of light reflected by its micro-mirrors is orthogonal to the plane in which the axis of projection light in the first decentered prism is included. This enables the DMD to be positioned such that the reflected light is put into such states as explained above. In this arrangement, the axis of illumination light incident on the DMD is not included in a plane that passes through the axis of projection light emerging from the DMD and the center of the display surface of the DMD.

As already explained, the DMD is a reflection type display device comprising two-dimensionally arrayed micro-mirrors, wherein the gradients of the micro-mirrors are varied to vary the angle of emergence of reflected light. Each micro-mirror corresponds to an image pixel. By varying the gradients of the micro-mirrors, it is possible to create on/off states.

When the projection optical system is constructed of the first decentered prism and the second decentered prism, it is desired that a transparent medium forming the first decentered prism be different in optical properties from a transparent medium forming the second decentered prism.

Now consider a projection optical system made up of two decentered prisms, each having two rotationally asymmetric reflecting surfaces, wherein any intermediate image is not formed. Such an optical system ensures that monochromatic aberrations such as coma are improved because of having satisfactory symmetry resulting from the stop being located near the center of the optical system. However, since the entrance surface and exit surface of each prism are each made up of a refracting surface, there are chromatic aberrations ascribable to chromatic dispersion of refractive index. In particular, chromatic aberration of magnification remains under-corrected even by use of a rotationally asymmetric free-form prism. Further, with a small optical system, it is more difficult to correct for the chromatic aberration of magnification, because of a relatively long wavelength.

In the present invention, therefore, the first and the second decentered prism are formed using transparent media with varying optical properties, so that chromatic aberrations, especially chromatic aberration of magnification can be well corrected. By forming the decentered prisms using media with varying optical properties, chromatic aberrations, especially chromatic aberration of magnification, stemming from dispersion on the refracting surfaces of the prisms can thus be well corrected.

Specifically, the "optical properties" of the transparent media referred to herein are the index of refraction, and Abbe number. It is thus required to use transparent media different from each other in terms of either one of these properties.

In what follows, the projection optical apparatus of the invention will be explained. In particular, the present invention will be explained with reference to examples of the projection optical system.

First of all, how to determine the X-, Y- and Z-axes of the coordinates for the examples is explained with reference to FIGS. 1 to 3. In back ray tracing where the projection optical system 2 is viewed from an image projection display screen, the plus direction of the Z-axis is defined by the (front) direction of the axis of projection light 7 toward the final surface of the projection optical system 2 (the exit surface 23 of the second decentered prism 20 in FIGS. 1 to 3), the plus direction of the X-axis by the right-to-left direction of the axis 7 in the horizontal direction, and the plus direction of the Y-axis by the below-to-above direction of the axis 7 in the vertical direction. The origin of the optical system is defined by a point at which the axis of projection light 8 crosses the final surface of the projection optical system 2. The following arrangements will be explained in the order of back ray tracing. Examples 1 to 6 will be explained with reference to the accompanying drawings.

In Examples 1 to 6, an image on the reflection type display device 1 is projected on a magnified scale onto the projection display screen 5 at a position 1,200 mm away from the first surface (the final surface of the projection optical system 2) in back ray tracing. The size of the projected image is 730.0×547.5 mm (36 inches in diagonal length), the diameter of the entrance pupil is set at φ7 mm, and the size of the reflection type display device 1 is 13.61×10.21 mm.

EXAMPLE 1

Figure 4:
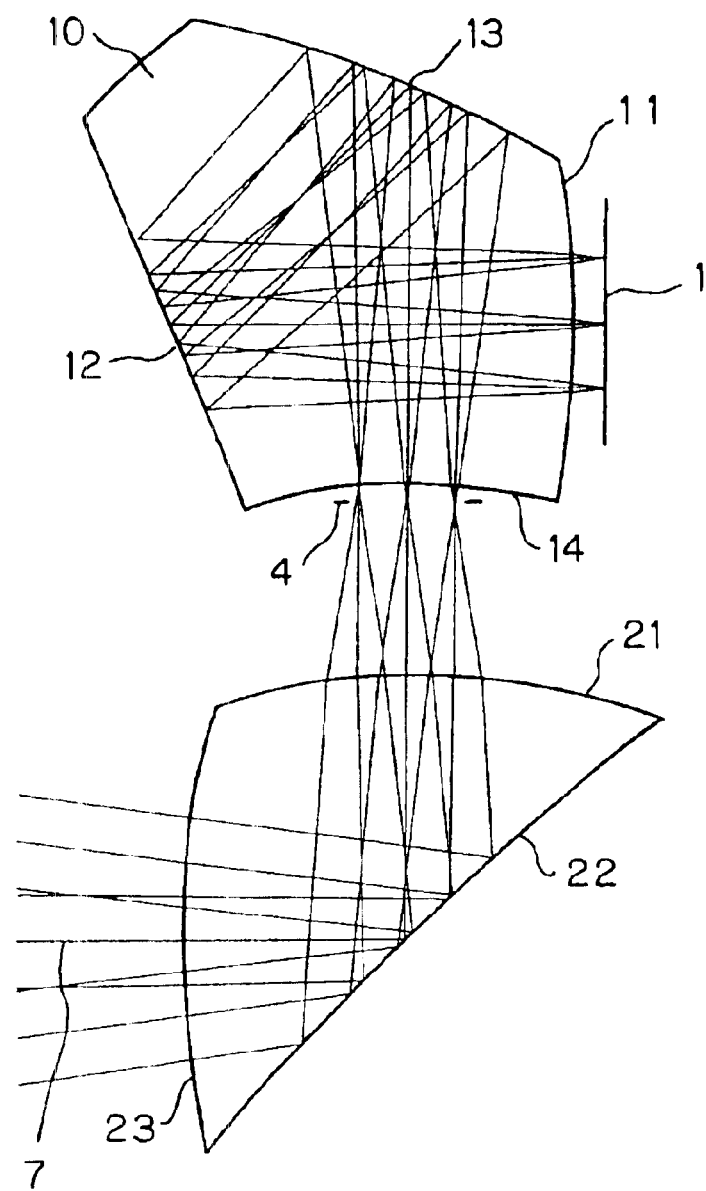
FIG. 4 is a Y-Z sectional view of the projection optical system in Example 1 according to the invention.
Figure 5:
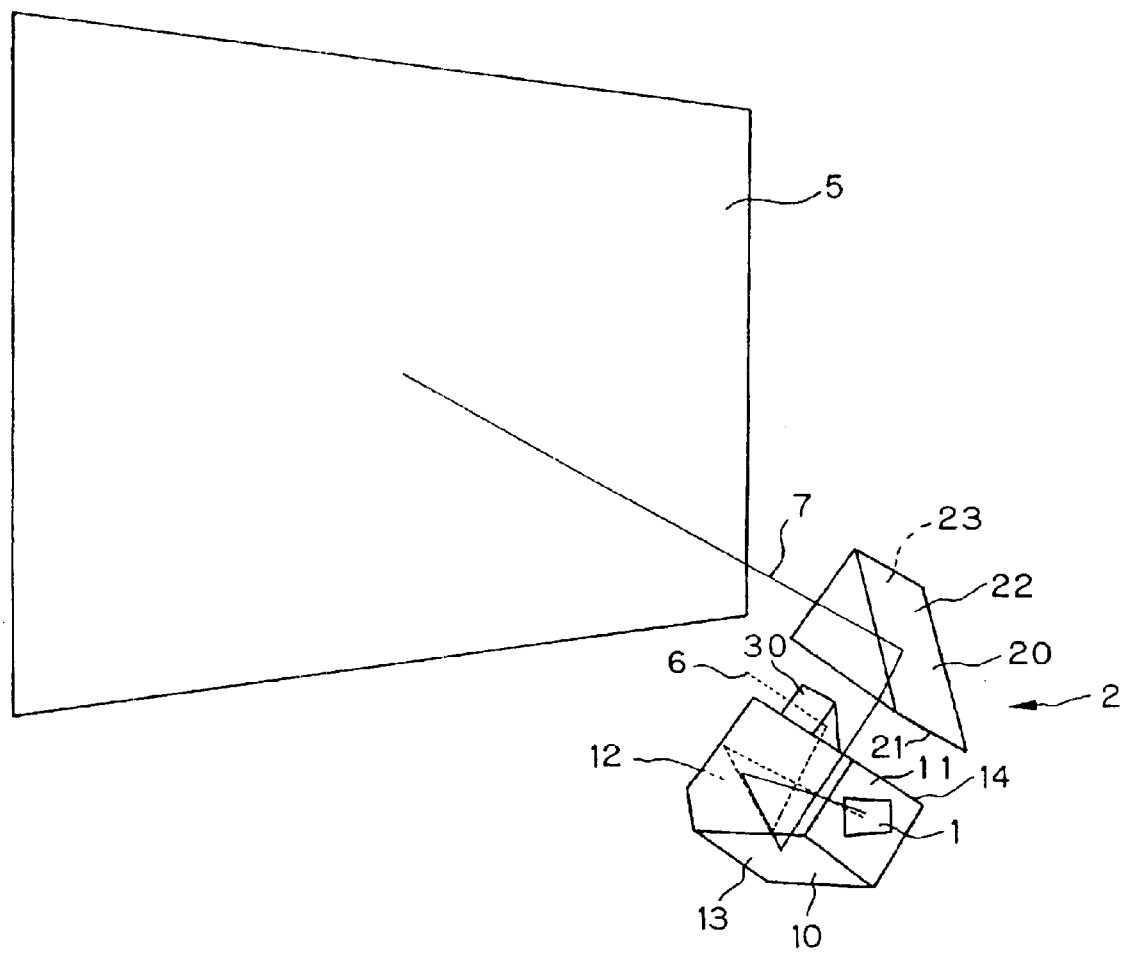
FIG. 5 is schematically illustrative in perspective of the whole construction of an optical apparatus using the projection optical system in Example 1 according to the invention.

This example is on the assumption that a DMD is used as the reflection type display device 1. FIG. 1 is illustrative in perspective of the projection optical system 2, as viewed obliquely from an upper portion of the projection display screen 5 (FIG. 5). FIG. 2 is a perspective view showing details of the projection optical system 2 as viewed from the same direction. FIG. 3 is a front perspective view as viewed from the front side of FIG. 1, and FIG. 2. FIG. 4 is a Y-Z sectional view of the projection optical system 2. FIG. 5 is schematically illustrative in perspective of the projection optical apparatus using the projection optical system according to this example.

In the instant example, the projection optical system 2 comprises a second decentered prism 20, a stop 4 and a first decentered prism 10 as viewed from the projection display screen 5. A reflection type display device 1 is located in opposition to an entrance surface 11 of the first decentered prism 10.

An illumination light-introducing prism 30 is located in opposition to an exit surface 14 of the first decentered prism 10. The illumination light-introducing prism 30 is located off a position through which an axis of projection light 7 passes.

The first decentered prism 10 is made up of four surfaces, i.e., an entrance surface 11 located in opposition to the reflection type display device 1, a first reflecting surface 12 for reflecting display light entered from the entrance surface 11 into the prism, a second reflecting surface 13 for reflecting the display light reflected at the first reflecting surface 12, and an exit surface 14 through which the display light reflected at the second reflecting surface 13 leaves the prism. In the first decentered prism 10, the axis of projection light 7 is reflected in such a way as to be included in the same Y-Z plane. In the prism, the axis of projection light 7 propagating from the entrance surface 11 toward the first reflecting surface 12 crosses the axis of projection light 7 propagating from the second reflecting surface 13 toward the exit surface 14.

The second decentered prism 20 is made up of three surfaces, i.e., an entrance surface 21 for entering the display light leaving the first decentered prism 10 into the prism, a reflecting surface 22 for reflecting the display light entered from the entrance surface 21 into the prism, and an exit surface 23 through which the display light reflected at the reflecting surface 22 leaves the prism. In the second decentered prism 20, the axis of projection light 7 is reflected in such a way as to be included in the same Y-Z plane.

Thus, the axis of projection light 7 from the reflection type display device 1 to the projection display screen 5 is allowed to exist in the same Y-Z plane.

An axis of illumination light 6 from an illumination light source 3 enters the exit surface 14 of the first decentered prism 10 via the illumination light-introducing prism 30. Then, the axis of illumination light entered into the first decentered prism 10 is reflected successively at the second reflecting surface 13 and the first reflecting surface 12, leaving the prism via the entrance surface 11. Upon leaving the decentered prism 10, the illumination light illuminates the display surface of the reflection type display device 1. In this case, the axis of illumination light 6 is incident from the diagonal direction of the reflection type display device 1, while it is incident on the center of the display surface of the reflection type display device 1 at an angle of about 20° with the direction of the normal. To that end, the reflection type display device 1 is positioned in such a way as to tilt 45° round the axis of projection light 7 incident on the first decentered prism 10.

As already described, the axis of illumination light 6 is incident on the exit surface 14 of the first decentered prism 10. At this time, the axis of illumination light 6 is incident in such a way as to be not included in the Y-Z plane in which the axis of projection light 7 from the reflection type display device 1 to the projection display screen 5 is included. In other words, the illumination light-introducing prism 30 is located such that the axis of illumination light 6 is incident on the exit surface 14 from a position displaced from the Y-Z plane with the axis of projection light 7 included therein in the -X direction.

As already described, the reflection type display device 1 is positioned at an angle of inclination of 45° around the axis of projection light 7 incident on the projection optical system 2. In addition, the whole optical system is located at an angle of inclination of 45° round the axis of projection light 7 leaving the projection optical system 2 and in the opposite direction (see FIG. 5). This is to compensate for a 45° tilt of a projected image on the projection display screen 5 and around the axis of projection light 7 leaving the projection optical system 2.

In the instant example, the surfaces 21 to 23 of the second decentered prism 20 and the surfaces 11 to 14 of the first decentered prism 10 are each formed of a de-centered free-form surface.

The constituting parameters for the projection optical system 2 in the instant example will be given later.

EXAMPLE 2

Figure 6:
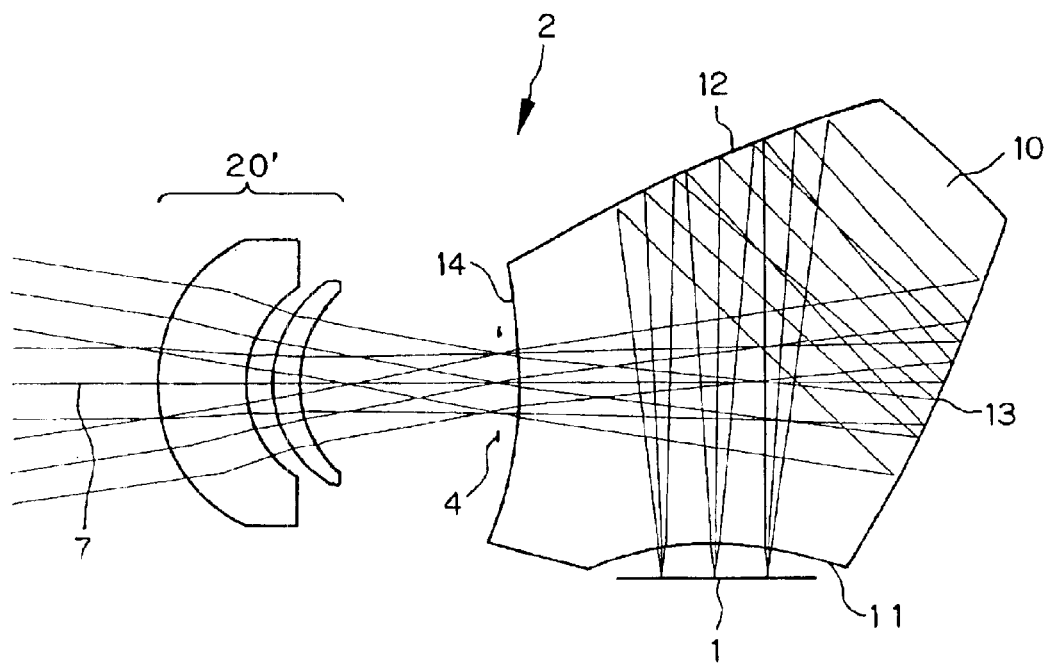
FIG. 6 is a Y-Z sectional view of the projection optical system in Example 2 according to the invention.
Figure 7:
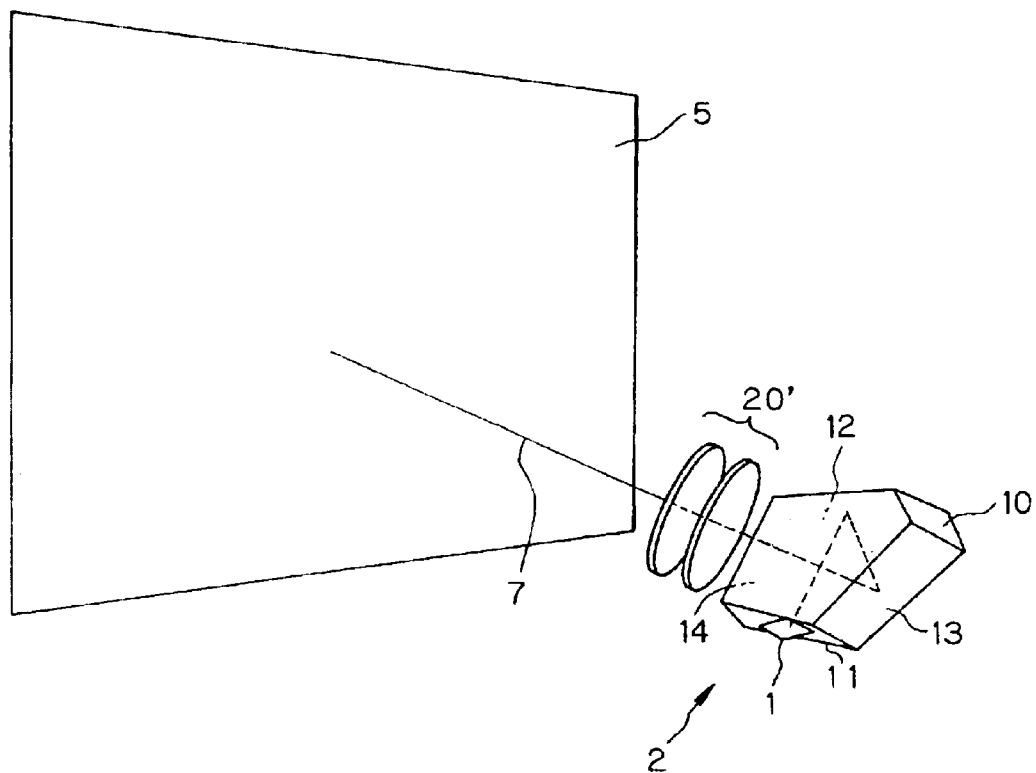
FIG. 7 is schematically illustrative in perspective of the whole construction of an optical apparatus using the projection optical system in Example 2 according to the invention.

This example is on the assumption that a DMD is used as the reflection display device 1. FIG. 6 is a Y-Z sectional view of the projection optical system 2 according to the instant example, and FIG. 7 is schematically illustrative in perspective of the projection optical apparatus using the projection optical system 2.

The projection optical system 2 according to this example comprises a coaxial refracting optical system 20' having positive power, a stop 4 and a first decentered prism 10, as viewed from a projection display screen 5.

The coaxial refracting optical system 20' is made up of two meniscus lenses each convex toward the projection display screen 5. The first decentered prism 10 is of the same shape as in Example 1. A reflection type display device 1 is located in opposition to an entrance surface 11 of the first decentered prism 10.

As in Example 1, an illumination light-introducing prism 30 is located in opposition to an entrance surface 14 of the first decentered prism 10. The illumination light-introducing prism 30, although not illustrated in FIGS. 6 and 7, is located off a position through which an axis of projection light 7 passes.

The first decentered prism 10 is made up of four surfaces, i.e., an entrance surface 11 located in opposition to the reflection type display device 11, a first reflecting surface 12 for reflecting display light entered from the entrance surface 11 into the prism, a second reflecting surface 13 for reflecting the display light reflected at the first reflecting surface 12, and an exit surface 14 through which the display light reflected at the second reflecting surface 13 leaves the prism. In the first decentered prism 10, the axis of projection light 7 is reflected in such a way as to be included in the same Y-Z plane. In the prism, the axis of projection light 7 propagating from the entrance surface 11 toward the first reflecting surface 12 crosses the axis of projection light 7 propagating from the second reflecting surface 13 toward the exit surface 14.

An axis of illumination light 6 from an illumination light source 3 enters the exit surface 14 of the first decentered prism 10 via the illumination light-introducing prism 30. Then, the axis of illumination light entered into the first decentered prism 10 is reflected successively at the second reflecting surface 13 and the first reflecting surface 12, leaving the prism via the entrance surface 11 for illumination of the display surface of the reflection type display device 1. In this case, the axis of illumination light 6 is incident from the diagonal direction of the reflection type display device 1, while it is incident on the center of the display surface of the reflection type display device 1 at an angle of about 20° with the direction of the normal. To that end, the reflection type display device 1 is located in such a way as to tilt 45° around the axis of projection light incident on the first decentered prism 10.

As already described, the axis of illumination light 6 is incident on the exit surface 14 of the first decentered prism 10. At this time, the axis of illumination light 6 is incident in such a way as to be not included in the Y-Z plane in which the axis of projection light 7 from the reflection type display device 1 to the projection display screen 5 is included. In other words, the illumination light-introducing prism 30 is located such that the axis of illumination light 6 is incident on the exit surface 14 from a position displaced from the Y-Z plane with the axis of projection light 7 included therein in the -X direction.

As already described, the reflection type display device 1 is located at an angle of inclination of 45° around the axis of projection light 7 incident on the projection optical system 2. In addition, the whole optical system is located at an angle of inclination of 45° around the axis of projection light 7 leaving the projection optical system 2 and in the opposite direction (see FIG. 7). This is to compensate for a 45° tilt of a projected image on the projection display screen 5 and around the axis of projection light 7 leaving the projection optical system 2.

In the instant example, the surfaces 11 to 14 of the first decentered prism 10 are each formed of a decentered free-form surface.

The constituting parameters for the projection optical system 2 in the instant example will be given later.

EXAMPLE 3

Figure 8:
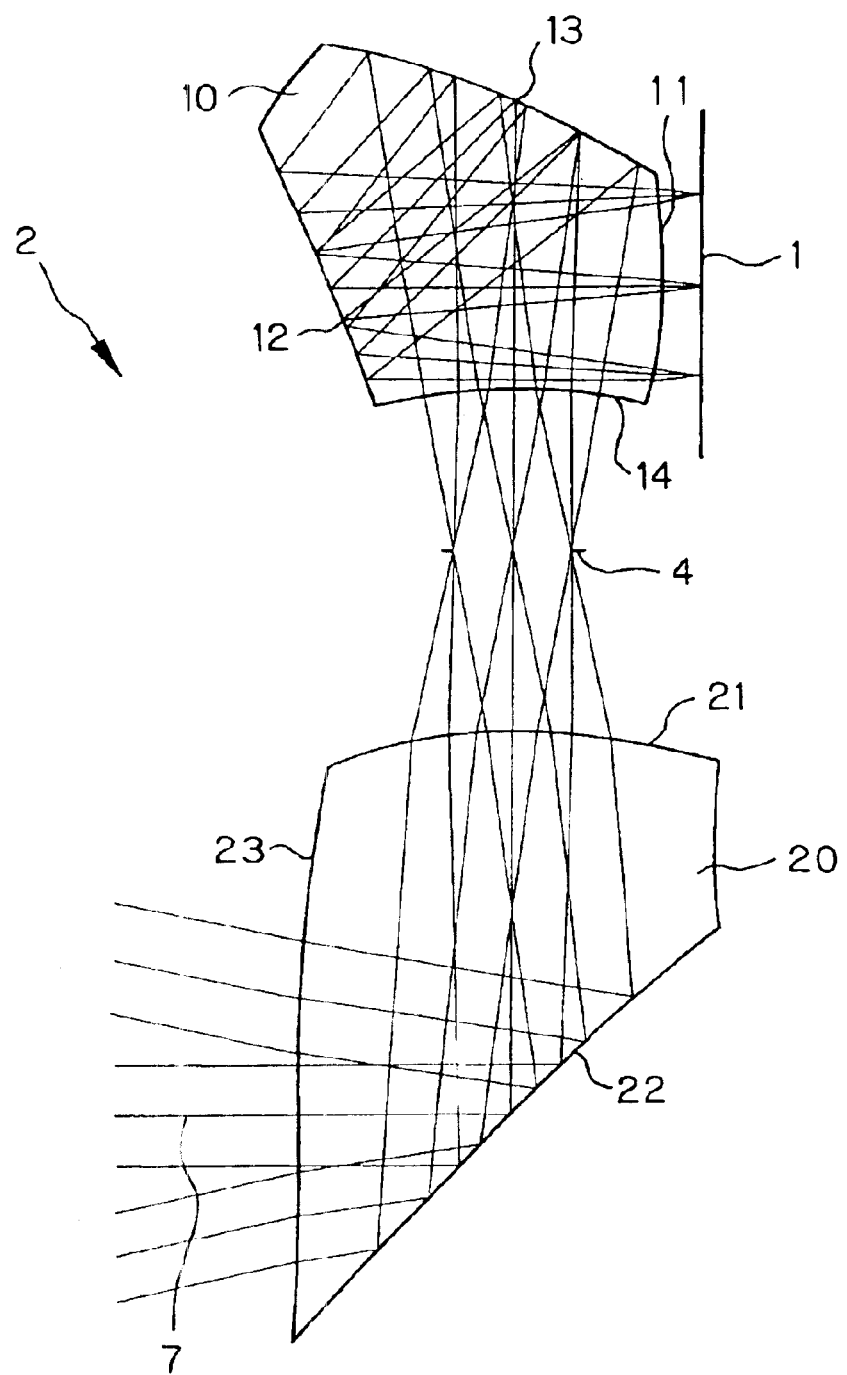
FIG. 8 is a Y-Z sectional view of the projection optical system in Example 3 according to the invention.
Figure 9:
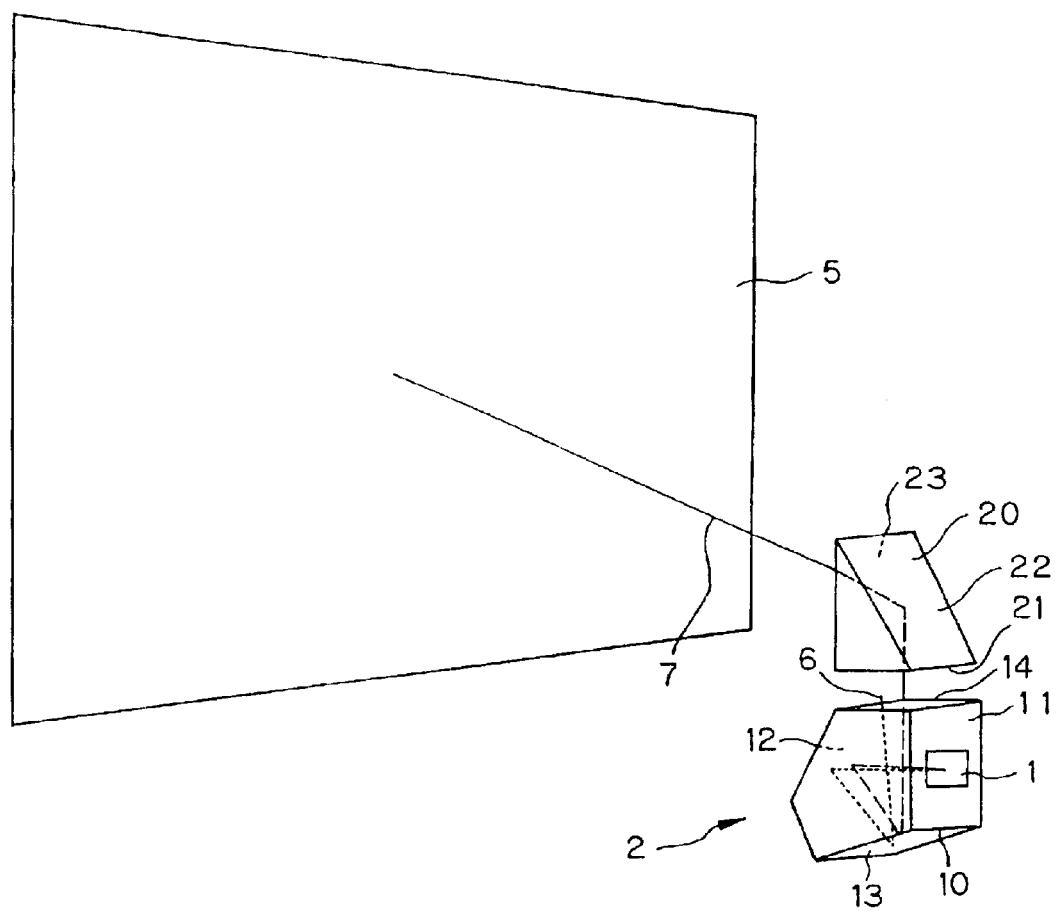
FIG. 9 is schematically illustrative in perspective of the whole construction of an optical apparatus using the projection optical system in Example 3 according to the invention.

The instant example is on the assumption that a reflection type liquid crystal display device is used as the reflection type display device 1. FIG. 8 is a Y-Z sectional view of a projection optical system 2 according to this example, and FIG. 9 is schematically illustrative in perspective of the optical apparatus using the projection optical system 2.

The optical projection system 2 according to the instant invention comprises a second decentered prism 20, a stop 4 and a first decentered prism 10, as viewed from a projection display screen 5. Both the second decentered prism 20 and the first decentered prism 10 are of the same shape as in Example 1. The reflection type display device 1 is located in opposition to an entrance surface 11 of the first decentered prism 10, and an illumination light-introducing prism 30 is located in opposition to an exit surface 14 of the first decentered prism 10 as in Example 1. This illumination light-introducing prism 30, although not shown in FIGS. 8 and 9, is located off a position through which an axis of projection light 7 passes.

The first decentered prism 10 is made up of four surfaces, i.e., an entrance surface 11 located in opposition to the reflection type display device 1, a first reflecting surface 12 for reflecting display light entered from the entrance surface 11 into the prism, a second reflecting surface 13 for reflecting the display light reflected at the first reflecting surface 12, and an exit surface 14 through which the display light reflected at the second reflecting surface 13 leaves the prism. In the first decentered prism 10, the axis of projection light 7 is reflected in such a way as to be included in the same Y-Z plane. In the prism, the axis of projection light 7 propagating from the entrance surface 11 toward the first reflecting surface 12 crosses the axis of projection light 7 propagating from the second reflecting surface 13 toward the exit surface 14.

The second decentered prism 20 is made up of three surfaces, i.e., an entrance surface 21 for entering the display light leaving the first decentered prism 10 into the prism, a reflecting surface 22 for reflecting the display light entered from the entrance surface 21 into the prism, and an exit surface 23 through which the display light reflected at the reflecting surface 22 leaves the prism. In the second decentered prism 20, the axis of projection light 7 is reflected in such a way as to be included in the same Y-Z plane.

Thus, the axis of projection light 7 from the reflection type display device 1 to the projection display screen 5 is allowed to exist in the same Y-Z plane.

An axis of illumination light 6 from an illumination light source 3 enters the exit surface 14 of the first decentered prism 10 via the illumination light-introducing prism 30. Then, the axis of illumination light entered into the first decentered prism 10 is reflected successively at the second reflecting surface 13 and the first reflecting surface 12, leaving the prism via the entrance surface 11. Upon leaving the decentered prism 10, the illumination light illuminates the display surface of the reflection type display device 1. In this case, the axis of illumination light 6 is incident obliquely and laterally from the longitudinal direction of the reflection type display device 1, while it is incident on the center of the display surface of the reflection type display device 1 at a given angle with the direction of the normal. Thus, the reflection type display device 1 is not inclined around the axis of projection light 7 incident on the first decentered prism 10.

As already described, the axis of illumination light 6 is incident on the exit surface 14 of the first decentered prism 10. At this time, the axis of illumination light 6 is incident in such a way as to be not included in the Y-Z plane in which the axis of projection light 7 from the reflection type display device 1 to the projection display screen 5 is included. In other words, the illumination light-introducing prism 30 is located such that the axis of illumination light 6 is incident on the exit surface 14 from a position displaced from the Y-Z plane with the axis of projection light 7 included therein in the -X direction.

In the instant invention, it is not necessary to incline the whole optical system around the axis of projection light 7 emerging from the projection optical system 2 (see FIG. 9).

In the instant example, the surfaces 21 to 23 of the second decentered prism 20 and the surfaces 11 to 14 of the first decentered prism 10 are each formed of a de-centered free-form surface.

The constituting parameters for the projection optical system 2 in the instant example will be given later.

EXAMPLE 4

Figure 10:
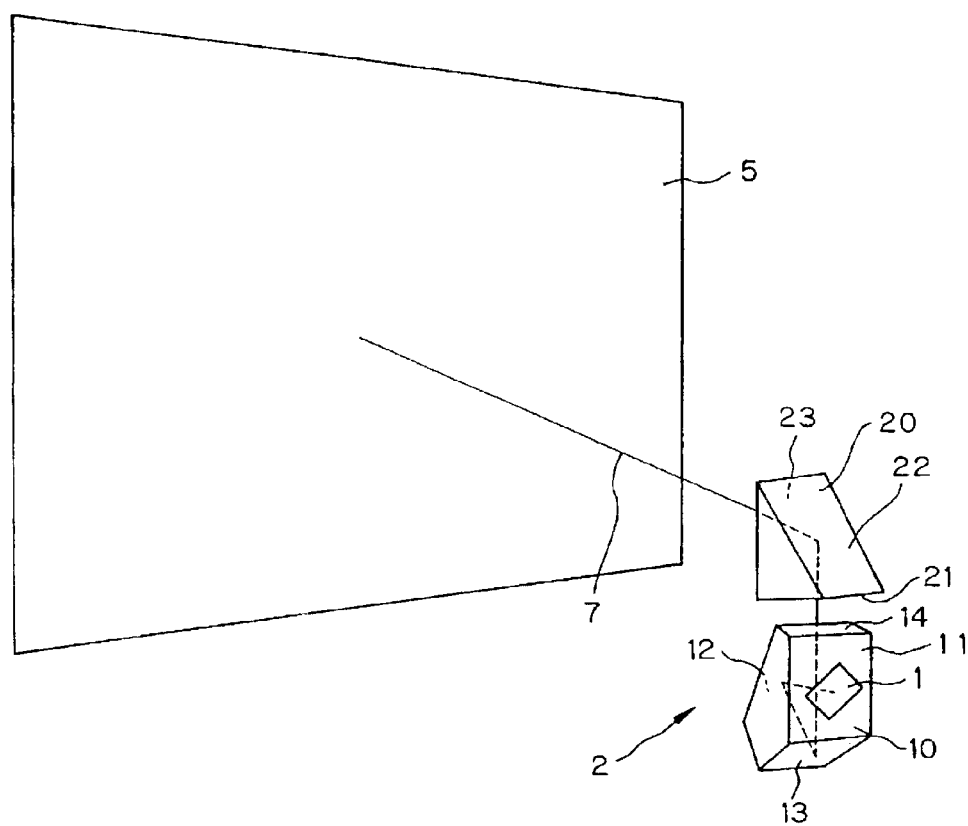
FIG. 10 is schematically illustrative in perspective of the whole construction of an optical apparatus using the projection optical system in Example 4 according to the invention.

The instant example is on the assumption that a DMD is used as the reflection type display device 1. FIG. 10 is schematically illustrative in perspective of the optical apparatus using the projection optical system 2 according to the instant example.

The optical projection system 2 according to the instant example comprises a second decentered prism 20, a stop 4 and a first decentered prism 10, as viewed from a projection display screen 5. Both the second decentered prism 20 and the first decentered prism 10 are of the same shape as in Example 1. The reflection type display device 1 is located in opposition to an entrance surface 11 of the first decentered prism 10, and an illumination light-introducing prism 30 is located in opposition to an exit surface 14 of the first decentered prism 10 as in Example 1. This illumination light-introducing prism 30, although not shown in FIG. 10, is located off a position through which an axis of projection light 7 passes.

The first decentered prism 10 is made up of four surfaces, i.e., an entrance surface 11 located in opposition to the reflection type display device 1, a first reflecting surface 12 for reflecting display light entered from the entrance surface 11 into the prism, a second reflecting surface 13 for reflecting the display light reflected at the first reflecting surface 12, and an exit surface 14 through which the display light reflected at the second reflecting surface 13 leaves the prism. In the first decentered prism 10, the axis of projection light 7 is reflected in such a way as to be included in the same Y-Z plane. In the prism, the axis of projection light 7 propagating from the entrance surface 11 toward the first reflecting surface 12 crosses the axis of projection light 7 propagating from the second reflecting surface 13 toward the exit surface 14.

The second decentered prism 20 is made up of three surfaces, i.e., an entrance surface 21 for entering the display light leaving the first decentered prism 10 into the prism, a reflecting surface 22 for reflecting the display light entered from the entrance surface 21 into the prism, and an exit surface 23 through which the display light reflected at the reflecting surface 22 leaves the prism. In the second decentered prism 20, the axis of projection light 7 is reflected in such a way as to be included in the same Y-2 plane.

In the instant example, a plane in which the axis of projection light 7 within the second decentered prism 20 is included makes an angle of 45° with a plane in which the axis of projection light 7 within the first decentered prism 10 is included. In other words, the second decentered prism 20 and the first decentered prism 10 are located such that the second decentered prism 20 is rotated 45° with respect to the first decentered prism 10 around the axis of projection light 7 leaving the first decentered prism 10.

An axis of illumination light 6 from an illumination light source 3 enters the exit surface 14 of the first decentered prism 10 via the illumination light-introducing prism 30. Then, the axis of illumination light entered into the first decentered prism 10 is reflected successively at the second reflecting surface 13 and the first reflecting surface 12, leaving the prism via the entrance surface 11. Upon leaving the decentered prism 10, the illumination light illuminates the display surface of the reflection type display device 1. In this case, the axis of illumination light 6 is incident from the diagonal direction of the reflection type display device 1, while it is incident on the center of the display surface of the reflection type display device 1 at an angle of about 20° with the direction of the normal. To that end, the reflection type display device 1 is located in such a way as to tilt 45° around the axis of projection light 7 incident on the first decentered prism 10.

As already described, the axis of illumination light 6 is incident on the exit surface 14 of the first decentered prism 10. At this time, the axis of illumination light 6 is incident in such a way as to be not included in the Y-Z plane in which the axis of projection light 7 from the reflection type display device 1 to the projection display screen 5 is included. In other words, the illumination light-introducing prism 30 is located such that the axis of illumination light 6 is incident on the exit surface 14 from a position displaced from the Y-Z plane with the axis of projection light 7 included in the –X direction.

The reflection type display device 1 is located at an angle of inclination of 45° around the axis of projection light 7 incident on the projection optical system 2, and the second decentered prism 20 is located such that it is rotated 45° around the axis of projection light 7 emerging from the first decentered prism 10 (FIG. 10). This is to compensate for a 45° tilt of an projected image on the projection display screen 5 around the axis of projection light 7 emerging from the projection optical system 2.

In the instant example, the surfaces 21 to 23 of the second decentered prism 20 and the surfaces 11 to 14 of the first decentered prism 10 are each formed of a de-centered free-form surface.

The constituting parameters for the projection optical system 2 in the instant example will be given later.

EXAMPLES 5 & 6

Figure 11:
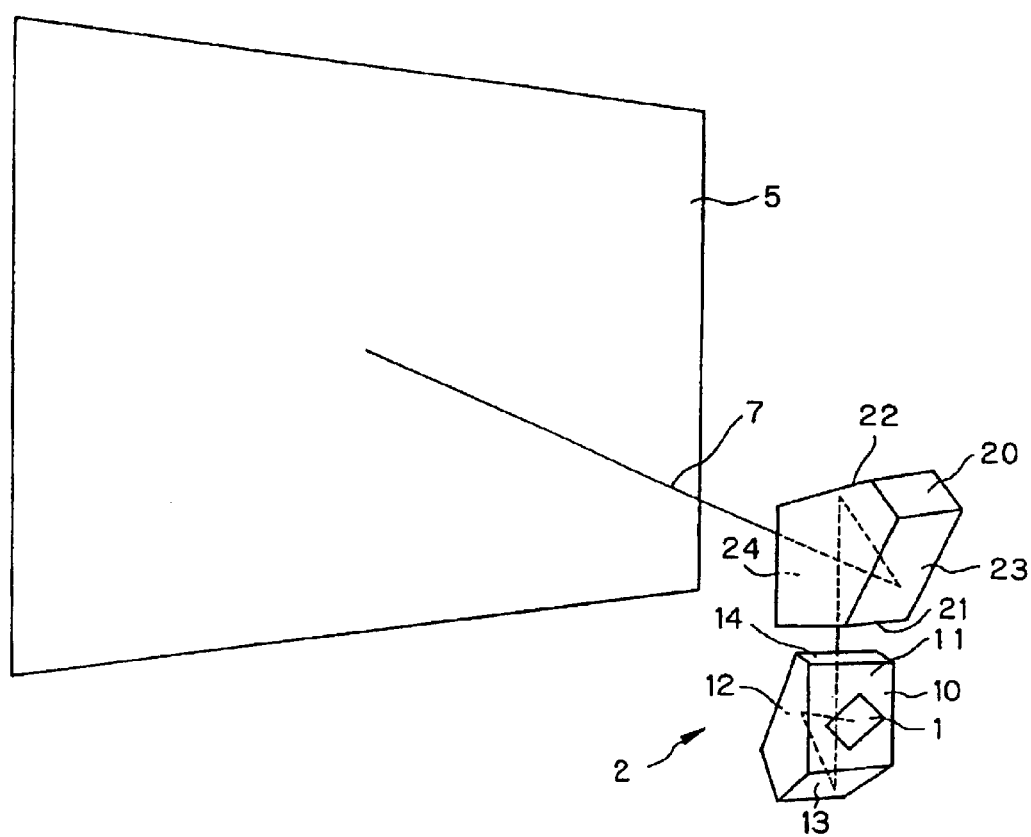
FIG. 11 is schematically illustrative in perspective of the whole construction of an optical apparatus using the projection optical system in Example 5, 6 according to the invention.

These examples are on the assumption that DMDs are used as the reflection type display device 1. FIG. 11 is schematically illustrative in perspective of the optical apparatus using the projection optical system 2 according to the examples.

The optical projection system 2 according to each example comprises a second decentered prism 20, a stop 4 and a first decentered prism 10, as viewed from a projection display screen 5. The first decentered prism 10 is of the same shape as in Example 1. The reflection type display device 1 is located in opposition to an entrance surface 11 of the first decentered prism 10, and an illumination light-introducing prism 30 is located in opposition to an exit surface 14 of the first decentered prism 10 as in Example 1. This illumination light-introducing prism 30, although not shown in FIG. 11, is located off a position through which an axis of projection light 7 passes.

The first decentered prism 10 is made up of four surfaces, i.e., an entrance surface 11 positioned in opposition to the reflection type display device 1, a first reflecting surface 12 for reflecting display light entered from the entrance surface 11 into the prism, a second reflecting surface 13 for reflecting the display light reflected at the first reflecting surface 12, and an exit surface 14 through which the display light reflected at the second reflecting surface 13 leaves the prism. In the first decentered prism 10, the axis of projection light 7 is reflected in such a way as to be included in the same Y-Z plane. In the prism, the axis of projection light 7 propagating from the entrance surface 11 toward the first reflecting surface 12 crosses the axis of projection light 7 propagating from the second reflecting surface 13 toward the exit surface 14.

The second decentered prism 20 is made up of four surfaces, i.e., an entrance surface 21 for entering the display light leaving the first decentered prism 10 into the prism, a first reflecting surface 22 for reflecting the display light entered from the entrance surface 21 into the prism, a second reflecting surface 23 for reflecting the display light reflected at the first reflecting surface 22, and an exit surface 24 through which the display light reflected at the second reflecting surface 23 leaves the prism. This second decentered prism 20 is of the same shape as the first decentered prism 10. In the second decentered prism 20, the axis of projection light 7 is reflected in such a way as to be included in the same Y-Z plane.

In each example, a plane in which the axis of projection light 7 within the second decentered prism 20 is included makes an angle of 45° with a plane in which the axis of projection light 7 within the first decentered prism 10 is included. In other words, the second decentered prism 20 and the first decentered prism 10 are located such that the second decentered prism 20 is rotated 45° with respect to the first decentered prism 10 around the axis of projection light 7 leaving the first decentered prism 10.

An axis of illumination light 6 from an illumination light source 3 enters the exit surface 14 of the first decentered prism 10 via the illumination light-introducing prism 30. Then, the axis of illumination light entered into the first decentered prism 10 is reflected successively at the second reflecting surface 13 and the first reflecting surface 12, leaving the prism via the entrance surface 11. Upon leaving the decentered prism 10, the illumination light illuminates the display surface of the reflection type display device 1. In this case, the axis of illumination light 6 is incident from the diagonal direction of the reflection type display device 1, while it is incident on the center of the display surface of the reflection type display device 1 at an angle of about 20° with the direction of the normal. To that end, the reflection type display device 1 is located in such a way as to tilt 45° around the axis of projection light 7 incident on the first decentered prism 10.

As already described, the axis of illumination light 6 is incident on the exit surface 14 of the first decentered prism 10. At this time, the axis of illumination light 6 is incident in such a way as to be not included in the Y-Z plane in which the axis of projection light 7 from the reflection type display device 1 to the projection display screen 5 is included. In other words, the illumination light-introducing prism 30 is located such that the axis of illumination light 6 is incident on the exit surface 14 from a position displaced from the Y-Z plane with the axis of projection light 7 included therein in the −X direction.

The reflection type display device 1 is located at an angle of inclination of 45° around the axis of projection light 7 incident on the projection optical system 2, and the second decentered prism 20 is located such that it is rotated 45° around the axis of projection light 7 emerging from the first decentered prism 10 (FIG. 11). This is to compensate for a 45° tilt of an projected image on the projection display screen 5 around the axis of projection light 7 emerging from the projection optical system 2.

In each example, the surfaces 21 to 24 of the second decentered prism 20 and the surfaces 11 to 14 of the first decentered prism 10 are each formed of a decentered free-form surface.

The constituting parameters for the projection optical system 2 in each example will be given later.

The constituting parameters for the projection optical systems 2 in Examples 1 to 6 are given below. As shown in FIGS. 2 and 3, the axis of projection light 7 is defined by a light ray that emerges from the center of the display surface of the reflection type display device 1 and arrives at the projection display screen 5 through the center of the pupil 4, as viewed in back ray tracing.

As viewed in back ray tracing, the origin is defined by a point of intersection of the axis of projection light 7 propagating from the projection display screen 5 toward the projection optical system 2 with the final surface of the projection optical system 2 (the apex of the final surface). The plus direction of the Z-axis is defined by the direction of propagation of the axis of projection light 7 toward the final surface of the projection optical system 2 (the front direction), the plus direction of the X-axis by the right-to-left horizontal direction (the right-to-left direction), and the plus direction of the Y-axis by the below-to-above vertical direction (the vertical direction).

As to decentered surfaces, each surface is given displacements in the X-, Y- and Z-axis directions (X, Y and Z, respectively) of the vertex position of the surface from the origin of the optical system, and tilt angles (°) of the center axis of the surface (the Z-axis of equation (a) set forth in the following publication in regard to free-form surfaces; the Z-axis of the following equation (b) in the case of aspheric surfaces) with respect to the X-, Y- and Z-axes ($\alpha$, $\beta$, $\gamma$ (°)). In this case, positive $\alpha$ and $\beta$ mean counterclockwise rotation relative to the positive directions of the respective axes, and positive $\gamma$ means clockwise rotation relative to the positive direction of the Z-axis. Referring to the $\alpha$, $\beta$, and $\gamma$ rotation of a surface, the center axis of the surface and its XYZ orthogonal coordinates are first rotated by $\alpha$ counterclockwise around the X-axis. Then, the axis of the thus rotated surface is rotated by $\beta$ in counterclockwise around the Y-axis of a new coordinate system and the once rotated coordinate system is rotated by $\beta$ counterclockwise around the Y-axis. Finally, the center axis of the once again rotated surface is rotated by $\gamma$ clockwise around the Z-axis of a new coordinate system.

Of the optical surfaces that form the optical system in each example, a specific surface and the subsequent surface are given a surface separation when they form a coaxial optical system. In addition, the radii of curvature of surfaces and the refractive indices and Abbe number of media are given according to a conventional method.

The shape of the free-form surface used herein, for instance, may be defined by equation (a) set forth in U.S. Pat. No. 6,124,989 (JP-A 2000-66105), and the Z-axis of that defining equation provides the axis of the free-form surface.

The terms concerning free-form surfaces on which no data are provided are zero. The refractive index is given on a d-line basis (587.76 nm wavelength), and length is given in mm.

In the following numerical data, "FFS" and "RE" stand for a free-form surface and a reflecting surface, respectively. It is noted that the object plane and the image plane are indicated by the projection image plane 5 and the display surface of the reflection type display device 1, respectively.

EXAMPLE 1

| Surface No. | Radius of curvature | Surface separation | Displacement and tilt | Refractive index | Abbe's No. |
|---|---|---|---|---|---|
| Object plane | ∞ | | (1) | | |
| 1 | FFS① | | | 1.4924 | 57.6 |
| 2 | FFS② (RE) | | (2) | 1.4924 | 57.6 |
| 3 | FFS③ | | (3) | | |
| 4 | ∞ (Stop) | | (4) | | |
| 5 | FFS④ | | (5) | 1.4924 | 57.6 |
| 6 | FFS⑤ (RE) | | (6) | 1.4924 | 57.6 |
| 7 | FFS⑥ (RE) | | (7) | 1.4924 | 57.6 |
| 8 | FFS⑦ | | (8) | | |
| Image plane | ∞ | | (9) | | |

FFS①
$C_4$ $6.8091 \times 10^{-3}$ $C_6$ $8.9914 \times 10^{-3}$ $C_8$ $-2.4721 \times 10^{-4}$
$C_{10}$ $6.4722 \times 10^{-5}$ FFS②
$C_4$ $-1.0594 \times 10^{-3}$ $C_6$ $2.8085 \times 10^{-3}$ $C_8$ $-2.0276 \times 10^{-5}$
$C_{10}$ $2.9571 \times 10^{-5}$ $C_{11}$ $-8.7851 \times 10^{-7}$ $C_{13}$ $-8.1133 \times 10^{-7}$
$C_{15}$ $7.3249 \times 10^{-7}$ FFS③
$C_4$ $-4.7838 \times 10^{-3}$ $C_6$ $1.5035 \times 10^{-2}$ $C_8$ $1.0081 \times 10^{-3}$
$C_{10}$ $-1.8708 \times 10^{-4}$ FFS④
$C_4$ $2.5890 \times 10^{-2}$ $C_6$ $1.5953 \times 10^{-2}$ $C_8$ $1.2005 \times 10^{-3}$
$C_{10}$ $-1.4249 \times 10^{-4}$ FFS⑤
$C_4$ $6.1496 \times 10^{-3}$ $C_6$ $7.1308 \times 10^{-3}$ $C_8$ $5.2260 \times 10^{-6}$
$C_{10}$ $1.8362 \times 10^{-6}$ $C_{11}$ $-1.1447 \times 10^{-6}$ $C_{13}$ $-1.4625 \times 10^{-7}$
$C_{15}$ $5.1726 \times 10^{-7}$ FFS⑥
$C_4$ $-5.8591 \times 10^{-3}$ $C_6$ $4.1503 \times 10^{-4}$ $C_8$ $-1.2559 \times 10^{-4}$
$C_{10}$ $8.8654 \times 10^{-6}$ $C_{11}$ $-1.7472 \times 10^{-6}$ $C_{13}$ $-3.6838 \times 10^{-6}$
$C_{15}$ $6.8127 \times 10^{-7}$ FFS⑦
$C_4$ $-9.7353 \times 10^{-3}$ $C_6$ $9.5723 \times 10^{-3}$ $C_8$ $-5.9950 \times 10^{-4}$
$C_{10}$ $-1.8043 \times 10^{-4}$ Displacement and tilt(1)
| X | 0.00 | Y | 0.00 | Z | -1200.00 |
| α | 0.00 | β | 0.00 | γ | 45.00 |

Displacement and tilt(2)
| X | 0.00 | Y | 0.00 | Z | 12.44 |
| α | -45.00 | β | 0.00 | γ | 0.00 |

Displacement and tilt(3)
| X | 0.00 | Y | 15.45 | Z | 12.44 |
| α | -90.00 | β | 0.00 | γ | 0.00 |

Displacement and tilt(4)
| X | 0.00 | Y | 25.36 | Z | 12.44 |
| α | -90.00 | β | 0.00 | γ | 0.00 |

Displacement and tilt(5)
| X | 0.00 | Y | 26.36 | Z | 12.44 |
| α | -90.00 | β | 0.00 | γ | 0.00 |

Displacement and tilt(6)
| X | 0.00 | Y | 48.86 | Z | 12.44 |
| α | -112.50 | β | 0.00 | γ | 0.00 |

Displacement and tilt(7)
| X | 0.00 | Y | 35.50 | Z | -0.92 |
| α | -157.50 | β | 0.00 | γ | 0.00 |

Displacement and tilt(8)
| X | 0.00 | Y | 35.50 | Z | 21.85 |
| α | -180.00 | β | 0.00 | γ | 0.00 |

Displacement and tilt(9)
| X | 0.00 | Y | 35.50 | Z | 23.57 |
| α | -180.00 | β | 0.00 | γ | -45.00 |

EXAMPLE 2

| Surface No. | Radius of curvature | Surface separation | Displacement and tilt | Refractive index | Abbe's No. |
|---|---|---|---|---|---|
| Object plane | ∞ | | (1) | | |
| 1 | ∞ | | | | |
| 2 | 11.56 | | (2) | 1.4875 | 70.4 |
| 3 | 8.02 | | (3) | | |
| 4 | 8.71 | | (4) | 1.5092 | 59.3 |
| 5 | 9.03 | | (5) | | |
| 6 | ∞ (Stop) | | (6) | | |
| 7 | FFS① | | (7) | 1.4924 | 57.6 |
| 8 | FFS② (RE) | | (8) | 1.4924 | 57.6 |
| 9 | FFS③ (RE) | | (9) | 1.4924 | 57.6 |
| 10 | FFS④ | | (10) | | |
| Image plane | ∞ | | (11) | | |

FFS①
$C_4$ $-1.6269 \times 10^{-2}$ $C_6$ $-1.3958 \times 10^{-2}$ $C_8$ $1.2005 \times 10^{-3}$
$C_{10}$ $1.6587 \times 10^{-4}$ FFS②
$C_4$ $-5.5890 \times 10^{-3}$ $C_6$ $-4.2159 \times 10^{-3}$ $C_8$ $7.2404 \times 10^{-5}$
$C_{10}$ $2.6520 \times 10^{-5}$ $C_{11}$ $-4.3471 \times 10^{-7}$ $C_{13}$ $-1.4172 \times 10^{-6}$
$C_{15}$ $-1.2542 \times 10^{-6}$ FFS③
$C_4$ $4.9701 \times 10^{-3}$ $C_6$ $4.8760 \times 10^{-3}$ $C_8$ $2.6570 \times 10^{-5}$
$C_{10}$ $-9.7540 \times 10^{-6}$ $C_{11}$ $-5.8319 \times 10^{-7}$ $C_{13}$ $-8.7007 \times 10^{-7}$
$C_{15}$ $-1.2780 \times 10^{-6}$ FFS④
$C_4$ $1.9707 \times 10^{-2}$ $C_6$ $2.1280 \times 10^{-2}$ $C_8$ $2.8436 \times 10^{-4}$
$C_{10}$ $-4.6898 \times 10^{-5}$ Displacement and tilt(1)
| X | 0.00 | Y | 0.00 | Z | -1200.00 |
| α | 0.00 | β | 0.00 | γ | 45.00 |

Displacement and tilt(2)
| X | 0.00 | Y | 0.00 | Z | 0.00 |
| α | 0.00 | β | 0.00 | γ | 0.00 |

-continued

| | | | | | | |
|---|---|---|---|---|---|---|
| | | | Displacement and tilt(3) | | | |
| X | 0.00 | Y | 0.00 | Z | 6.11 | |
| α | 0.00 | β | 0.00 | γ | 0.00 | |
| | | | Displacement and tilt(4) | | | |
| X | 0.00 | Y | 0.00 | Z | 7.89 | |
| α | 0.00 | β | 0.00 | γ | 0.00 | |
| | | | Displacement and tilt(5) | | | |
| X | 0.00 | Y | 0.00 | Z | 9.80 | |
| α | 0.00 | β | 0.00 | γ | 0.00 | |
| | | | Displacement and tilt(6) | | | |
| X | 0.00 | Y | 0.00 | Z | 23.56 | |
| α | 0.00 | β | 0.00 | γ | 0.00 | |
| | | | Displacement and tilt(7) | | | |
| X | 0.00 | Y | 0.00 | Z | 24.98 | |
| α | 0.00 | β | 0.00 | γ | 0.00 | |
| | | | Displacement and tilt(8) | | | |
| X | 0.00 | Y | 0.00 | Z | 54.69 | |
| α | −22.50 | β | 0.00 | γ | 0.00 | |
| | | | Displacement and tilt(9) | | | |
| X | 0.00 | Y | 15.82 | Z | 38.87 | |
| α | −67.50 | β | 0.00 | γ | 0.00 | |
| | | | Displacement and tilt(10) | | | |
| X | 0.00 | Y | −11.56 | Z | 38.87 | |
| α | −90.00 | β | 0.00 | γ | 0.00 | |
| | | | Displacement and tilt(11) | | | |
| X | 0.00 | Y | −14.04 | Z | 38.87 | |
| α | −90.00 | β | 0.00 | γ | −45.00 | |

EXAMPLE 3

| Surface No. | Radius of curvature | Surface separation | Displacement and tilt | Refractive index | Abbe's No. |
|---|---|---|---|---|---|
| Object plane | ∞ | | (1) | | |
| 1 | FFS① | | | 1.4924 | 57.6 |
| 2 | FFS② (RE) | | (2) | 1.4924 | 57.6 |
| 3 | FFS③ | | (3) | | |
| 4 | ∞ (Stop) | | (4) | | |
| 5 | FFS④ | | (5) | 1.4924 | 57.6 |
| 6 | FFS⑤ (RE) | | (6) | 1.4924 | 57.6 |
| 7 | FFS⑥ (RE) | | (7) | 1.4924 | 57.6 |
| 8 | FFS⑦ | | (8) | | |
| Image plane | ∞ | | (9) | | |

FFS①

| $C_4$ | $9.3298 \times 10^{-3}$ | $C_6$ | $9.2282 \times 10^{-4}$ | $C_7$ | $-2.6786 \times 10^{-5}$ |
|---|---|---|---|---|---|
| $C_8$ | $-4.9982 \times 10^{-5}$ | $C_9$ | $2.5479 \times 10^{-4}$ | $C_{10}$ | $2.4669 \times 10^{-4}$ |

FFS②

| $C_4$ | $-7.2942 \times 10^{-4}$ | $C_6$ | $1.7125 \times 10^{-3}$ | $C_7$ | $4.4980 \times 10^{-6}$ |
|---|---|---|---|---|---|
| $C_8$ | $1.2130 \times 10^{-5}$ | $C_8$ | $1.9812 \times 10^{-5}$ | $C_{10}$ | $2.4264 \times 10^{-5}$ |
| $C_{11}$ | $-2.0904 \times 10^{-7}$ | $C_{12}$ | $2.9589 \times 10^{-7}$ | $C_{13}$ | $3.5188 \times 10^{-7}$ |
| $C_{14}$ | $7.4955 \times 10^{-7}$ | $C_{15}$ | $1.0501 \times 10^{-6}$ | | |

FFS③

| $C_4$ | $-1.5671 \times 10^{-2}$ | $C_8$ | $1.6491 \times 10^{-2}$ | $C_7$ | $8.9825 \times 10^{-5}$ |
|---|---|---|---|---|---|
| $C_8$ | $5.7132 \times 10^{-4}$ | $C_9$ | $-5.4764 \times 10^{-4}$ | $C_{10}$ | $-2.5398 \times 10^{-4}$ |

FFS④

| $C_4$ | $1.0604 \times 10^{-2}$ | $C_6$ | $1.5130 \times 10^{-2}$ | $C_7$ | $1.5781 \times 10^{-4}$ |
|---|---|---|---|---|---|
| $C_8$ | $3.1048 \times 10^{-4}$ | $C_9$ | $-8.0121 \times 10^{-4}$ | $C_{10}$ | $2.1858 \times 10^{-5}$ |

FFS⑤

| $C_4$ | $5.9599 \times 10^{-3}$ | $C_6$ | $8.9163 \times 10^{-3}$ | $C_7$ | $1.3098 \times 10^{-5}$ |
|---|---|---|---|---|---|
| $C_8$ | $-7.0396 \times 10^{-5}$ | $C_9$ | $-5.0955 \times 10^{-6}$ | $C_{10}$ | $8.5524 \times 10^{-6}$ |
| $C_{11}$ | $4.9139 \times 10^{-7}$ | $C_{12}$ | $-4.8582 \times 10^{-8}$ | $C_{13}$ | $3.6872 \times 10^{-7}$ |
| $C_{14}$ | $-3.4003 \times 10^{-7}$ | $C_{15}$ | $2.5281 \times 10^{-7}$ | | |

FFS⑥

| $C_4$ | $-6.7057 \times 10^{-3}$ | $C_6$ | $4.3417 \times 10^{-3}$ | $C_7$ | $1.4197 \times 10^{-5}$ |
|---|---|---|---|---|---|
| $C_8$ | $-2.7031 \times 10^{-4}$ | $C_9$ | $1.0850 \times 10^{-4}$ | $C_{10}$ | $1.4768 \times 10^{-4}$ |
| $C_{11}$ | $-5.3609 \times 10^{-7}$ | $C_{12}$ | $-2.5406 \times 10^{-6}$ | $C_{13}$ | $-5.9738 \times 10^{-6}$ |
| $C_{14}$ | $3.5345 \times 10^{-6}$ | $C_{15}$ | $2.8943 \times 10^{-6}$ | | |

FFS⑦

| $C_4$ | $-2.5519 \times 10^{-2}$ | $C_6$ | $1.3790 \times 10^{-2}$ | $C_7$ | $9.0713 \times 10^{-4}$ |
|---|---|---|---|---|---|
| $C_8$ | $-1.3777 \times 10^{-3}$ | $C_9$ | $4.4602 \times 10^{-4}$ | $C_{10}$ | $8.1380 \times 10^{-4}$ |

| | | | Displacement and tilt(1) | | | |
|---|---|---|---|---|---|---|
| X | 0.00 | Y | 0.00 | Z | −1200.00 | |
| α | 0.00 | β | 0.00 | γ | 0.00 | |
| | | | Displacement and tilt(2) | | | |
| X | 0.00 | Y | 0.00 | Z | 12.25 | |
| α | −45.00 | β | 0.00 | γ | 0.00 | |
| | | | Displacement and tilt(3) | | | |
| X | 0.00 | Y | 22.81 | Z | 12.25 | |
| α | −90.00 | β | 0.00 | γ | 0.00 | |
| | | | Displacement and tilt(4) | | | |
| X | 0.00 | Y | 33.48 | Z | 12.25 | |
| α | −90.00 | β | 0.00 | γ | 0.00 | |
| | | | Displacement and tilt(5) | | | |
| X | 0.00 | Y | 42.96 | Z | 12.25 | |
| α | −90.00 | β | 0.00 | γ | 0.00 | |
| | | | Displacement and tilt(6) | | | |
| X | 0.00 | Y | 59.43 | Z | 12.25 | |
| α | −112.50 | β | 0.00 | γ | 0.00 | |
| | | | Displacement and tilt(7) | | | |
| X | 0.00 | Y | 48.91 | Z | 1.74 | |
| α | −157.50 | β | 0.00 | γ | 0.00 | |
| | | | Displacement and tilt(8) | | | |
| X | 0.00 | Y | 48.91 | Z | 20.83 | |
| α | −180.00 | β | 0.00 | γ | 0.00 | |
| | | | Displacement and tilt(9) | | | |
| X | 0.00 | Y | 48.91 | Z | 23.08 | |
| α | −180.00 | β | 10.00 | γ | 0.00 | |

EXAMPLE 4

| Surface No. | Radius of curvature | Surface separation | Displacement and tilt | Refractive index | Abbe's No. |
|---|---|---|---|---|---|
| Object plane | ∞ | | (1) | | |
| 1 | FFS① | | | 1.7552 | 27.6 |
| 2 | FFS② (RE) | | (2) | 1.7552 | 27.6 |
| 3 | FFS③ | | (3) | | |
| 4 | ∞ (Stop) | | (4) | | |
| 5 | FFS④ | | (5) | 1.5088 | 68.2 |
| 6 | FFS⑤ (RE) | | (6) | 1.5088 | 68.2 |
| 7 | FFS⑥ (RE) | | (7) | 1.5088 | 68.2 |
| 8 | FFS⑦ | | (8) | | |
| Image plane | ∞ | | (9) | | |

FFS①

| $C_4$ | $4.2989 \times 10^{-3}$ | $C_5$ | $-1.2883 \times 10^{-3}$ | $C_6$ | $1.0182 \times 10^{-2}$ |
|---|---|---|---|---|---|

-continued

| | | | | | |
|---|---|---|---|---|---|
| $C_7$ | $2.6155 \times 10^{-6}$ | $C_8$ | $5.9167 \times 10^{-5}$ | $C_9$ | $1.0709 \times 10^{-5}$ |
| $C_{10}$ | $-6.8105 \times 10^{-5}$ | | | | |

FFS②

| | | | | | |
|---|---|---|---|---|---|
| $C_4$ | $-5.9749 \times 10^{-4}$ | $C_5$ | $-1.1772 \times 10^{-3}$ | $C_6$ | $1.9769 \times 10^{-3}$ |
| $C_7$ | $-1.1223 \times 10^{-6}$ | $C_8$ | $-3.8718 \times 10^{-6}$ | $C_9$ | $-2.3494 \times 10^{-5}$ |
| $C_{10}$ | $2.9728 \times 10^{-5}$ | $C_{11}$ | $-5.4885 \times 10^{-7}$ | $C_{12}$ | $-5.8200 \times 10^{-7}$ |
| $C_{13}$ | $5.2841 \times 10^{-7}$ | $C_{14}$ | $-2.0975 \times 10^{-7}$ | $C_{15}$ | $2.2147 \times 10^{-7}$ |

FFS③

| | | | | | |
|---|---|---|---|---|---|
| $C_4$ | $-2.2464 \times 10^{-3}$ | $C_5$ | $-8.7840 \times 10^{-4}$ | $C_6$ | $-1.2195 \times 10^{-2}$ |
| $C_7$ | $-2.7718 \times 10^{-4}$ | $C_8$ | $-5.2352 \times 10^{-4}$ | $C_9$ | $-3.7322 \times 10^{-5}$ |
| $C_{10}$ | $4.8929 \times 10^{-4}$ | | | | |

FFS④

| | | | | | |
|---|---|---|---|---|---|
| $C_4$ | $7.7146 \times 10^{-4}$ | $C_5$ | $-3.3221 \times 10^{-2}$ | $C_6$ | $-4.6107 \times 10^{-3}$ |
| $C_7$ | $-2.3980 \times 10^{-4}$ | $C_8$ | $1.2005 \times 10^{-3}$ | $C_9$ | $-1.9513 \times 10^{-4}$ |
| $C_{10}$ | $7.3906 \times 10^{-5}$ | | | | |

FFS⑤

| | | | | | |
|---|---|---|---|---|---|
| $C_4$ | $5.3916 \times 10^{-3}$ | $C_5$ | $-8.5164 \times 10^{-4}$ | $C_6$ | $4.8949 \times 10^{-3}$ |
| $C_7$ | $6.1656 \times 10^{-6}$ | $C_8$ | $3.8395 \times 10^{-5}$ | $C_9$ | $-3.8998 \times 10^{-5}$ |
| $C_{10}$ | $1.3846 \times 10^{-8}$ | $C_{11}$ | $6.9769 \times 10^{-7}$ | $C_{12}$ | $8.9109 \times 10^{-7}$ |
| $C_{13}$ | $-3.2507 \times 10^{-8}$ | $C_{14}$ | $-3.0447 \times 10^{-8}$ | $C_{15}$ | $7.4263 \times 10^{-7}$ |

FFS⑥

| | | | | | |
|---|---|---|---|---|---|
| $C_4$ | $-4.8608 \times 10^{-3}$ | $C_5$ | $5.5089 \times 10^{-4}$ | $C_6$ | $-3.2594 \times 10^{-3}$ |
| $C_7$ | $6.8152 \times 10^{-6}$ | $C_8$ | $-3.1111 \times 10^{-5}$ | $C_9$ | $-3.5032 \times 10^{-5}$ |
| $C_{10}$ | $-3.4600 \times 10^{-5}$ | $C_{11}$ | $3.2365 \times 10^{-7}$ | $C_{12}$ | $3.2128 \times 10^{-6}$ |
| $C_{13}$ | $-3.4451 \times 10^{-6}$ | $C_{14}$ | $2.7333 \times 10^{-6}$ | $C_{15}$ | $5.6830 \times 10^{-7}$ |

FFS⑦

| | | | | | |
|---|---|---|---|---|---|
| $C_4$ | $4.6699 \times 10^{-4}$ | $C_5$ | $1.5730 \times 10^{-2}$ | $C_6$ | $3.2156 \times 10^{-3}$ |
| $C_7$ | $-1.5354 \times 10^{-5}$ | $C_8$ | $-3.2900 \times 10^{-4}$ | $C_9$ | $-1.3150 \times 10^{-3}$ |
| $C_{10}$ | $4.3665 \times 10^{-5}$ | | | | |

| Displacement and tilt(1) | | | | | |
|---|---|---|---|---|---|
| X | 0.00 | Y | 0.00 | Z | −1200.00 |
| α | 0.00 | β | 0.00 | γ | 0.00 |

| Displacement and tilt(2) | | | | | |
|---|---|---|---|---|---|
| X | 0.00 | Y | 0.00 | Z | 13.77 |
| α | −45.00 | β | 0.00 | γ | 0.00 |

| Displacement and tilt(3) | | | | | |
|---|---|---|---|---|---|
| X | 0.00 | Y | 14.65 | Z | 13.77 |
| α | −90.00 | β | 0.00 | γ | 0.00 |

| Displacement and tilt(4) | | | | | |
|---|---|---|---|---|---|
| X | 0.00 | Y | 17.71 | Z | 13.77 |
| α | −90.00 | β | 0.00 | γ | 45.00 |

| Displacement and tilt(5) | | | | | |
|---|---|---|---|---|---|
| X | 0.00 | Y | 18.71 | Z | 13.77 |
| α | −90.00 | β | 0.00 | γ | 45.00 |

| Displacement and tilt(6) | | | | | |
|---|---|---|---|---|---|
| X | 0.00 | Y | 41.49 | Z | 13.77 |
| α | −106.33 | β | −15.70 | γ | 42.73 |

| Displacement and tilt(7) | | | | | |
|---|---|---|---|---|---|
| X | 9.21 | Y | 28.46 | Z | 4.55 |
| α | −149.64 | β | −40.79 | γ | 20.94 |

| Displacement and tilt(8) | | | | | |
|---|---|---|---|---|---|
| X | −6.12 | Y | 28.46 | Z | 19.89 |
| α | −180.00 | β | −45.00 | γ | 0.00 |

| Displacement and tilt(9) | | | | | |
|---|---|---|---|---|---|
| X | −6.95 | Y | 28.46 | Z | 20.71 |
| α | −180.00 | β | −45.00 | γ | −45.00 |

EXAMPLE 5

| Surface No. | Radius of curvature | Surface separation | Displacement and tilt | Refractive index | Abbe's No. |
|---|---|---|---|---|---|
| Object plane | ∞ | | (1) | | |
| 1 | FFS① | | | 1.4875 | 70.4 |
| 2 | FFS② (RE) | | (2) | 1.4875 | 70.4 |
| 3 | FFS③ (RE) | | (3) | 1.4875 | 70.4 |
| 4 | FFS④ | | (4) | | |
| 5 | ∞ (Stop) | | (5) | 1.5281 | 52.6 |
| 6 | FFS⑤ | | (6) | 1.5281 | 52.6 |
| 7 | FFS⑥ (RE) | | (7) | 1.5281 | 52.6 |
| 8 | FFS⑦ (RE) | | (8) | | |
| 9 | FFS⑧ | | (9) | | |
| Image plane | ∞ | | (10) | | |

FFS①

| | | | | | |
|---|---|---|---|---|---|
| $C_4$ | $8.9607 \times 10^{-3}$ | $C_5$ | $-6.8680 \times 10^{-4}$ | $C_6$ | $3.1200 \times 10^{-2}$ |
| $C_7$ | $-2.2704 \times 10^{-4}$ | $C_8$ | $8.7887 \times 10^{-4}$ | $C_9$ | $3.3485 \times 10^{-4}$ |
| $C_{10}$ | $-3.0776 \times 10^{-4}$ | | | | |

FFS②

| | | | | | |
|---|---|---|---|---|---|
| $C_4$ | $-7.0920 \times 10^{-3}$ | $C_5$ | $7.8223 \times 10^{-4}$ | $C_6$ | $-7.2947 \times 10^{-3}$ |
| $C_7$ | $-2.7624 \times 10^{-5}$ | $C_8$ | $-1.6065 \times 10^{-5}$ | $C_9$ | $3.8935 \times 10^{-5}$ |
| $C_{10}$ | $4.9827 \times 10^{-5}$ | $C_{11}$ | $2.1185 \times 10^{-7}$ | $C_{12}$ | $1.0801 \times 10^{-7}$ |
| $C_{13}$ | $1.3385 \times 10^{-5}$ | $C_{14}$ | $1.9531 \times 10^{-6}$ | $C_{15}$ | $4.8432 \times 10^{-6}$ |

FFS③

| | | | | | |
|---|---|---|---|---|---|
| $C_4$ | $1.2147 \times 10^{-2}$ | $C_5$ | $5.8941 \times 10^{-4}$ | $C_6$ | $1.0360 \times 10^{-2}$ |
| $C_7$ | $-9.0553 \times 10^{-5}$ | $C_8$ | $5.5037 \times 10^{-4}$ | $C_9$ | $1.9906 \times 10^{-4}$ |
| $C_{10}$ | $-2.8358 \times 10^{-4}$ | $C_{11}$ | $-8.1100 \times 10^{-6}$ | $C_{12}$ | $-9.8655 \times 10^{-6}$ |
| $C_{13}$ | $3.8522 \times 10^{-5}$ | $C_{14}$ | $3.5845 \times 10^{-6}$ | $C_{15}$ | $5.5724 \times 10^{-6}$ |

FFS④

| | | | | | |
|---|---|---|---|---|---|
| $C_4$ | $-3.7478 \times 10^{-2}$ | $C_5$ | $4.3638 \times 10^{-3}$ | $C_6$ | $-4.2695 \times 10^{-2}$ |
| $C_7$ | $5.8617 \times 10^{-4}$ | $C_8$ | $-1.2502 \times 10^{-3}$ | $C_9$ | $-4.4465 \times 10^{-4}$ |
| $C_{10}$ | $1.1549 \times 10^{-3}$ | | | | |

FFS⑤

| | | | | | |
|---|---|---|---|---|---|
| $C_4$ | $-3.2003 \times 10^{-2}$ | $C_5$ | $-2.6689 \times 10^{-2}$ | $C_6$ | $-3.6711 \times 10^{-2}$ |
| $C_7$ | $1.6582 \times 10^{-4}$ | $C_8$ | $1.2005 \times 10^{-3}$ | $C_9$ | $2.1055 \times 10^{-3}$ |
| $C_{10}$ | $6.7384 \times 10^{-4}$ | | | | |

FFS⑥

| | | | | | |
|---|---|---|---|---|---|
| $C_4$ | $-5.1949 \times 10^{-3}$ | $C_5$ | $-4.7878 \times 10^{-4}$ | $C_6$ | $-4.9258 \times 10^{-3}$ |
| $C_7$ | $-1.9416 \times 10^{-5}$ | $C_8$ | $2.1687 \times 10^{-5}$ | $C_9$ | $4.3747 \times 10^{-5}$ |
| $C_{10}$ | $2.9404 \times 10^{-5}$ | $C_{11}$ | $-4.2660 \times 10^{-7}$ | $C_{12}$ | $8.2344 \times 10^{-7}$ |
| $C_{13}$ | $5.9896 \times 10^{-8}$ | $C_{14}$ | $1.0826 \times 10^{-6}$ | $C_{15}$ | $-7.6572 \times 10^{-8}$ |

FFS⑦

| | | | | | |
|---|---|---|---|---|---|
| $C_4$ | $5.6793 \times 10^{-3}$ | $C_5$ | $-1.0769 \times 10^{-3}$ | $C_6$ | $4.0807 \times 10^{-3}$ |
| $C_7$ | $-1.8251 \times 10^{-5}$ | $C_8$ | $-3.8749 \times 10^{-5}$ | $C_9$ | $3.5780 \times 10^{-5}$ |
| $C_{10}$ | $-1.4815 \times 10^{-6}$ | $C_{11}$ | $-5.0377 \times 10^{-7}$ | $C_{12}$ | $5.1151 \times 10^{-7}$ |
| $C_{13}$ | $4.3297 \times 10^{-8}$ | $C_{14}$ | $1.0385 \times 10^{-6}$ | $C_{15}$ | $-4.1980 \times 10^{-8}$ |

FFS⑧

| | | | | | |
|---|---|---|---|---|---|
| $C_4$ | $2.6410 \times 10^{-2}$ | $C_5$ | $-8.8970 \times 10^{-3}$ | $C_6$ | $2.0898 \times 10^{-2}$ |
| $C_7$ | $-8.6245 \times 10^{-5}$ | $C_8$ | $-4.4155 \times 10^{-4}$ | $C_9$ | $1.6185 \times 10^{-4}$ |
| $C_{10}$ | $8.8770 \times 10^{-5}$ | | | | |

| Displacement and tilt(1) | | | | | |
|---|---|---|---|---|---|
| X | 0.00 | Y | 0.00 | Z | −1200.00 |
| α | 0.00 | β | 0.00 | γ | 0.00 |

| Displacement and tilt(2) | | | | | |
|---|---|---|---|---|---|
| X | 0.00 | Y | 0.00 | Z | 19.43 |
| α | 22.50 | β | 0.00 | γ | 0.00 |

| Displacement and tilt(3) | | | | | |
|---|---|---|---|---|---|
| X | 0.00 | Y | −13.63 | Z | 5.80 |
| α | 67.50 | β | 0.00 | γ | 0.00 |

| Displacement and tilt(4) | | | | | |
|---|---|---|---|---|---|
| X | 0.00 | Y | 8.21 | Z | 5.80 |

-continued

| | | | | | |
|---|---|---|---|---|---|
| α | 90.00 | β | 0.00 | γ | 0.00 |
| | | Displacement and tilt(5) | | | |
| X | 0.00 | Y | 12.41 | Z | 5.80 |
| α | 90.00 | β | 0.00 | γ | 45.00 |
| | | Displacement and tilt(6) | | | |
| X | 0.00 | Y | 13.41 | Z | 5.80 |
| α | 90.00 | β | 0.00 | γ | 45.00 |
| | | Displacement and tilt(7) | | | |
| X | 0.00 | Y | 44.59 | Z | 5.80 |
| α | 73.67 | β | −15.70 | γ | 42.73 |
| | | Displacement and tilt(8) | | | |
| X | −11.70 | Y | 28.03 | Z | −5.91 |
| α | 30.36 | β | −40.79 | γ | 20.94 |
| | | Displacement and tilt(9) | | | |
| X | 7.03 | Y | 28.03 | Z | 12.83 |
| α | 0.00 | β | −45.00 | γ | 0.00 |
| | | Displacement and tilt(10) | | | |
| X | 21.76 | Y | 28.03 | Z | 27.56 |
| α | 0.00 | β | −45.00 | γ | −45.00 |

EXAMPLE 6

| Surface No. | Radius of curvature | Surface separation | Displacement and tilt | Refractive index | Abbe's No. |
|---|---|---|---|---|---|
| Object plane | ∞ | | (1) | | |
| 1 | FFS① | | | 1.7552 | 27.6 |
| 2 | FFS② (RE) | | (2) | 1.7552 | 27.6 |
| 3 | FFS③ (RE) | | (3) | 1.7552 | 27.6 |
| 4 | FFS④ | | (4) | | |
| 5 | ∞ (Stop) | | (5) | 1.4875 | 70.4 |
| 6 | FFS⑤ | | (6) | 1.4875 | 70.4 |
| 7 | FFS⑥ (RE) | | (7) | 1.4875 | 70.4 |
| 8 | FFS⑦ (RE) | | (8) | | |
| 9 | FFS⑧ | | (9) | | |
| Image plane | ∞ | | (10) | | |

FFS①
$C_4$ 5.1638 × 10$^{-3}$  $C_5$ 5.0652 × 10$^{-5}$  $C_6$ 4.3811 × 10$^{-3}$
$C_7$ 1.3741 × 10$^{-6}$  $C_8$ −1.6974 × 10$^{-5}$  $C_9$ 1.3838 × 10$^{-5}$
$C_{10}$ 3.2824 × 10$^{-6}$
FFS②
$C_4$ 1.6150 × 10$^{-3}$  $C_5$ −5.4130 × 10$^{-4}$  $C_6$ 4.0839 × 10$^{-3}$
$C_7$ 9.9564 × 10$^{-7}$  $C_8$ −2.1304 × 10$^{-5}$  $C_9$ 1.4346 × 10$^{-5}$
$C_{10}$ −3.0124 × 10$^{-5}$  $C_{11}$ −7.7491 × 10$^{-8}$  $C_{12}$ 1.0349 × 10$^{-7}$
$C_{13}$ 2.6473 × 10$^{-7}$  $C_{14}$ −2.1943 × 10$^{-7}$  $C_{15}$ 1.9439 × 10$^{-7}$
FFS③
$C_4$ −3.1976 × 10$^{-3}$  $C_5$ −8.3139 × 10$^{-4}$  $C_6$ 1.7910 × 10$^{-3}$
$C_7$ −8.7376 × 10$^{-6}$  $C_8$ −2.8171 × 10$^{-5}$  $C_9$ 6.0348 × 10$^{-6}$
$C_{10}$ −1.0533 × 10$^{-5}$  $C_{11}$ −6.6993 × 10$^{-7}$  $C_{12}$ 3.1109 × 10$^{-7}$
$C_{13}$ −1.5051 × 10$^{-6}$  $C_{14}$ −9.4957 × 10$^{-8}$  $C_{15}$ −2.7479 × 10$^{-7}$
FFS④
$C_4$ 3.1422 × 10$^{-3}$  $C_5$ 2.8723 × 10$^{-4}$  $C_6$ 1.1404 × 10$^{-3}$
$C_7$ −7.2869 × 10$^{-5}$  $C_8$ −4.2283 × 10$^{-5}$  $C_9$ 1.1974 × 10$^{-4}$
$C_{10}$ −1.9637 × 10$^{-5}$
FFS⑤
$C_4$ 4.1903 × 10$^{-3}$  $C_5$ −1.7103 × 10$^{-2}$  $C_6$ 1.1897 × 10$^{-3}$
$C_7$ −2.2095 × 10$^{-5}$  $C_8$ −2.8941 × 10$^{-4}$  $C_{10}$ −4.0904 × 10$^{-8}$
FFS⑥
$C_4$ −3.6419 × 10$^{-3}$  $C_5$ −4.0108 × 10$^{-5}$  $C_6$ −3.2596 × 10$^{-3}$
$C_7$ −8.5024 × 10$^{-6}$  $C_8$ 9.6344 × 10$^{-7}$  $C_9$ 1.0897 × 10$^{-5}$
$C_{10}$ 7.0846 × 10$^{-6}$  $C_{11}$ 1.9849 × 10$^{-7}$  $C_{12}$ −6.9036 × 10$^{-7}$
$C_{13}$ 1.1972 × 10$^{-6}$  $C_{14}$ 2.7183 × 10$^{-7}$  $C_{15}$ 6.6353 × 10$^{-8}$
FFS⑦
$C_4$ 3.0296 × 10$^{-3}$  $C_5$ 6.0925 × 10$^{-4}$  $C_6$ 2.4968 × 10$^{-3}$
$C_7$ −7.6108 × 10$^{-6}$  $C_8$ −1.4515 × 10$^{-5}$  $C_9$ 1.7190 × 10$^{-5}$
$C_{10}$ −9.6467 × 10$^{-6}$  $C_{11}$ 1.1763 × 10$^{-7}$  $C_{12}$ 4.8445 × 10$^{-9}$
$C_{13}$ 5.8332 × 10$^{-7}$  $C_{14}$ 5.7569 × 10$^{-7}$  $C_{15}$ 1.5561 × 10$^{-7}$
FFS⑧
$C_4$ −2.2921 × 10$^{-3}$  $C_5$ 3.3906 × 10$^{-3}$  $C_6$ −2.1936 × 10$^{-3}$
$C_7$ −2.6289 × 10$^{-5}$  $C_8$ −5.1374 × 10$^{-5}$  $C_9$ 6.8019 × 10$^{-5}$
$C_{10}$ −4.1738 × 10$^{-5}$

| | | | | | |
|---|---|---|---|---|---|
| | | Displacement and tilt(1) | | | |
| X | 0.00 | Y | 0.00 | Z | −1200.00 |
| α | 0.00 | β | 0.00 | γ | 0.00 |
| | | Displacement and tilt(2) | | | |
| X | 0.00 | Y | 0.00 | Z | 19.76 |
| α | 22.50 | β | 0.00 | γ | 0.00 |
| | | Displacement and tilt(3) | | | |
| X | 0.00 | Y | −13.91 | Z | 5.85 |
| α | 67.50 | β | 0.00 | γ | 0.00 |
| | | Displacement and tilt(4) | | | |
| X | 0.00 | Y | 10.64 | Z | 5.85 |
| α | 90.00 | β | 0.00 | γ | 0.00 |
| | | Displacement and tilt(5) | | | |
| X | 0.00 | Y | 11.64 | Z | 5.85 |
| α | 90.00 | β | 0.00 | γ | 45.00 |
| | | Displacement and tilt(6) | | | |
| X | 0.00 | Y | 15.33 | Z | 5.85 |
| α | 90.00 | β | 0.00 | γ | 45.00 |
| | | Displacement and tilt(7) | | | |
| X | 0.00 | Y | 41.98 | Z | 5.85 |
| α | 73.67 | β | −15.70 | γ | 42.73 |
| | | Displacement and tilt(8) | | | |
| X | −10.07 | Y | 21.74 | Z | −4.22 |
| α | 30.36 | β | −40.79 | γ | 20.94 |
| | | Displacement and tilt(9) | | | |
| X | 7.68 | Y | 27.74 | Z | 13.53 |
| α | 0.00 | β | −45.00 | γ | 0.00 |
| | | Displacement and tilt(10) | | | |
| X | 19.02 | Y | 27.74 | Z | 24.87 |
| α | 0.00 | β | −45.00 | γ | −45.00 |

Figure 12:
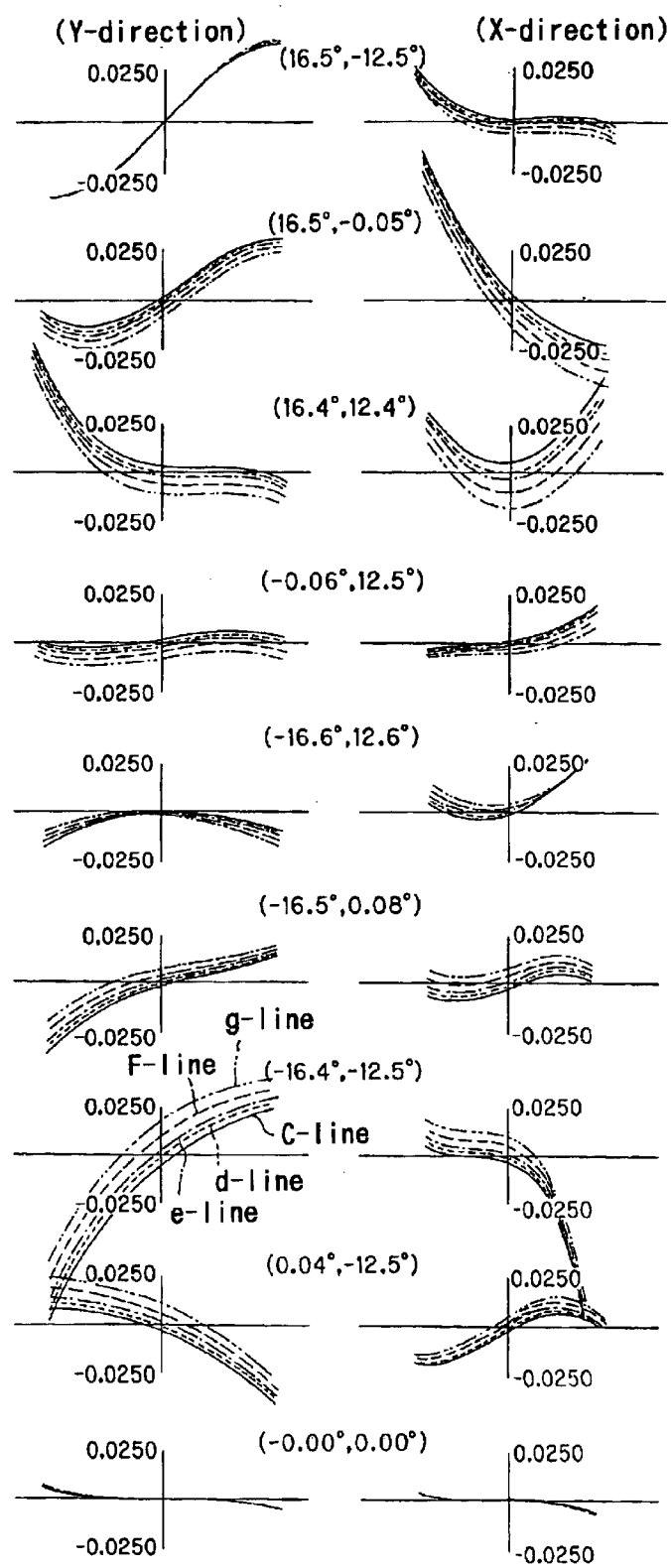
FIG. 12 is illustrative of tranvsverse aberrations for Example 1.

Transverse aberration diagrams for Example 1 are shown in FIG. 12, wherein the bracketed figures are representative of horizontal (X-direction) angles of view and vertical (Y-direction) angles of view. FIG. 12 shows transverse aberrations at those angles of view.

Throughout the examples given above, let PX and PY indicate the powers of the whole optical system in the X-, and Y-directions, respectively. Also let Px1 and Py1 represent the powers of the first decentered prism 10 in the X-, and Y-directions, respectively, and Px2 and Py2 stand for the powers of the second decentered prism 20 or the coaxial refracting optical system in the X-, and Y-directions, respectively. It is noted that the power of each decentered prism is calculated using a coordinate system where Y is the direction of the plane in which the axis of projection light 7 of the decentered prism is included.

For the projection optical system 2 of the invention, it is preferable to satisfy $0 < Px/Py < 2$         (1)

More preferably, $0.5 < Px/Py < 1.5$         (1-1)

Most preferably, $0.9 < Px/Py < 1.1$         (1-2)

As the lower limits of 0, 0.5 or 0.9 to these conditions are not reached, the power in the X-direction becomes weak, resulting in an image less magnified in the X-direction and, hence, large distortion. As the upper limits of 2, 1.5 or 1.1 are exceeded, the power in the Y-direction becomes weak, resulting in an image less magnified in the Y-direction and, hence, large distortion.

The values of Px/Py, Px2/Px1 and Py2/Py1 in Examples 1 to 6 are tabulated below.

| Example | 1 | 2 | 3 | 4 | 5 | 6 |
|---|---|---|---|---|---|---|
| Px/Py | 0.983 | 0.993 | 0.933 | 0.983 | 0.979 | 0.990 |
| Px2/Px1 | 0.127 | 0.067 | 0.011 | 0.140 | 0.805 | 0.810 |
| Py2/Py1 | 0.064 | 0.067 | 0.160 | 0.422 | 0.239 | 0.248 |

In Examples 4, 5 and 6, the first decentered prism 10 and the second decentered prism 20 are formed of different transparent materials, so that chromatic aberrations based on the refracting surface of each decentered prism, especially chromatic aberration of magnification, can be well corrected.

As described above, the present invention can provide a small-sized projection optical apparatus which uses a decentered prism as the projection optical system and in which some contrivances are provided to how to introduce illumination light into a reflection type display device. The present invention is particularly suited for a projection optical apparatus wherein a DMD is used as the display device.

What is claimed is:

1. A projection optical apparatus, comprising:

a reflection type display device, a projection optical system for projecting an image displayed on the reflection type display device onto a projection display screen, and an illumination light source for illuminating a display surface of the reflection type display device, wherein:

the projection optical system comprises an optical element having positive power, said optical element being located in opposition to the display surface of the reflection type display device, and said optical element comprising at least two reflecting surfaces, at least one of which is defined by a rotationally asymmetric curved reflecting surface configured into a curved shape that imparts power to a light beam, and the illumination light source is located such that given two light rays are reflected at at least first and second reflecting surfaces of the reflecting surfaces of the optical element as counted in order of a projection light ray traced from a display surface side, provided that said given two light rays are a light ray leaving the display surface and arriving at the projection display screen and a light ray leaving the illumination light source and arriving at the display surface, said illumination light source being located such that an axis of illumination light incident on the optical element is not included in a given plane, wherein:

said axis of illumination light is defined by a center light ray of an illumination light beam from the illumination light source, said center light ray arriving at a center of the display surface, an axis of projection light is defined by a light ray leaving the center of the display surface and arriving at the projection display screen through a center of a pupil of the optical system, and said given plane is a plane that passes through the axis of projection light leaving the optical element and the center of the display surface.

2. A projection optical apparatus, comprising:

a reflection type display device, a projection optical system for projecting an image displayed on the reflection type display device onto a projection display screen, and an illumination light source for illuminating a display surface of the reflection type display device, wherein:

the projection optical system comprises an optical element having positive power, said optical element being located in opposition to the display surface of the reflection type display device, and said optical element comprising at least two reflecting surfaces, at least one of which is defined by a rotationally asymmetric curved reflecting surface configured into a curved shape that imparts power to a light beam, the illumination light source is located such that given two light rays are reflected at at least a first reflecting surface of the reflecting surfaces of the optical element as counted in order of a projection light ray traced from a display surface side, provided that said given two light rays are a light ray leaving the display surface and arriving at the projection display screen and a light ray leaving the illumination light source and arriving at the display surface, said illumination light source being located such that an axis of illumination light incident on the optical element is not included in a given plane, wherein:

said axis of illumination light is defined by a center light ray of an illumination light beam from the illumination light source, said center light ray arriving at a center of the display surface, an axis of projection light is defined by a light ray leaving the center of the display surface and arriving at the projection display screen through a center of a pupil of the optical system, and said given plane is a plane that passes through the axis of projection light leaving the optical element and the center of the display surface, and the reflection type display device comprises a two-dimensionally arrayed micro-mirrors, each having a variable gradient so that an angle of emergence of reflected light can be varied.

3. The projection optical apparatus according to claim 1, wherein:

the optical element comprises a first decentered prism having two reflecting surfaces that are a first reflecting surface and a second reflecting surface constructed such that when an axis of projection light incident on the first reflecting surface and an axis of projection light reflected at the second reflecting surface are projected, the projected axes of projection light cross each other, and the projection plane is a plane including an axis of projection light reflected at a reflecting surface on which an axis of projection light leaving the display surface is first incident and an axis of projection light incident on that reflecting surface.

4. The projection optical apparatus according to claim 3, wherein:

the projection optical system includes another optical system located on a side of the first decentered prism, from which a projection light rays emerges.

5. The projection optical apparatus according to claim 4, wherein:

said another optical system is a second decentered prism comprising at least one reflecting surface defined by a rotationally asymmetric curved reflecting surface configured into a curved shape that gives power to a light beam.

6. The projection optical apparatus according to claim 5, wherein: the first decentered prism and the second decentered prism are located such that, given virtual planes including the axes of projection light passing through the prisms, the virtual plane within the first decentered prism and the virtual plane within the second decentered prism are parallel with each other.

7. The projection optical apparatus according to claim 5, wherein:

the first decentered prism and the second decentered prism are located such that, given virtual planes including the axes of projection light passing through the prisms, the virtual plane within the first decentered prism makes an angle of 45° with the virtual plane within the second decentered prism.

8. The projection optical apparatus according to claim 5, wherein:

the second decentered prism comprising two reflecting surfaces that are a first reflecting surface and a second reflecting surface constructed such that when an axis of projection light incident on the first reflecting surface and an axis of projection light reflected at the second reflecting surface are projected, the projected axes of projection light cross each other, and the projection plane is a plane including an axis of projection light reflected at a reflecting surface on which an axis of projection light leaving the display surface is first incident and an axis of projection light incident on that reflecting surface.

9. The projection optical apparatus according to claim 5, wherein:

the second decentered prism comprises one reflecting surface only.

10. The projection optical apparatus according to claim 1, wherein:

the reflection type display device comprises a reflection type liquid crystal display device.

11. The projection optical apparatus according to claim 2, wherein:

the reflection type display device is located such that a direction of deflection of light reflected at the micromirrors is orthogonal to the virtual plane within the first decentered prism.

12. The projection optical apparatus according to claim 5, wherein:

a medium that forms the first decentered prism is different in optical properties from a medium that forms the second decentered prism.

13. The projection optical apparatus according to claim 2, wherein:

the optical element comprises a first decentered prism having two reflecting surfaces that are a first reflecting surface and a second reflecting surface constructed such that when an axis of projection light incident on the first reflecting surface and an axis of projection light reflected at the second reflecting surface are projected, the projected axes of projection light cross each other, and the projection plane is a plane including an axis of projection light reflected at a reflecting surface on which an axis of projection light leaving the display surface is first incident and axis of projection light incident on that reflecting surface.

14. The projection optical apparatus according to claim 2, wherein:

the reflection type display device comprises a reflection type liquid crystal display device.

* * * * *